(12) United States Patent
Hirade et al.

(10) Patent No.: US 11,193,028 B2
(45) Date of Patent: Dec. 7, 2021

(54) ACTIVE-ENERGY-RAY-CURABLE COMPOSITION, ACTIVE-ENERGY-RAY-CURABLE INK, COMPOSITION STORED CONTAINER, TWO-DIMENSIONAL OR THREE-DIMENSIONAL IMAGE FORMING METHOD, TWO-DIMENSIONAL OR THREE-DIMENSIONAL IMAGE FORMING APPARATUS, AND PROCESSED PRODUCT

(71) Applicant: RICOH COMPANY LTD., Tokyo (JP)

(72) Inventors: Tomohiro Hirade, Kanagawa (JP); Tsuyoshi Asami, Kanagawa (JP)

(73) Assignee: RICOH COMPANY, LTD, Tokyo (JP)

( * ) Notice: Subject to any disclaimer, the term of this patent is extended or adjusted under 35 U.S.C. 154(b) by 0 days.

(21) Appl. No.: 16/796,558

(22) Filed: Feb. 20, 2020

(65) Prior Publication Data
US 2020/0199384 A1 Jun. 25, 2020

Related U.S. Application Data

(63) Continuation of application No. 15/351,974, filed on Nov. 15, 2016, now Pat. No. 10,604,666.

(30) Foreign Application Priority Data

Nov. 16, 2015 (JP) .................................. 2015-223940

(51) Int. Cl.
| | |
|---|---|
| B29D 22/00 | (2006.01) |
| C08F 2/46 | (2006.01) |
| C08G 61/04 | (2006.01) |
| C09D 11/101 | (2014.01) |
| C09D 11/322 | (2014.01) |
| C09D 133/14 | (2006.01) |
| B33Y 70/00 | (2020.01) |
| C09D 11/326 | (2014.01) |
| B29C 64/165 | (2017.01) |
| B29C 64/314 | (2017.01) |

(52) U.S. Cl.
CPC .......... *C09D 11/101* (2013.01); *B29C 64/165* (2017.08); *B29C 64/314* (2017.08); *B33Y 70/00* (2014.12); *C09D 11/322* (2013.01); *C09D 11/326* (2013.01); *C09D 133/14* (2013.01); *C08L 2312/06* (2013.01)

(58) Field of Classification Search
CPC ... B29C 64/314; B29C 64/165; C09D 11/101; C09D 11/322; C09D 11/326; C09D 133/14; B33Y 70/00; C08L 2312/06
USPC .................. 428/34.1; 522/1; 520/1
See application file for complete search history.

(56) References Cited

U.S. PATENT DOCUMENTS

| | | | |
|---|---|---|---|
| 8,632,174 B2 | 1/2014 | Noguchi et al. | |
| 8,727,522 B2 | 5/2014 | Maekawa et al. | |
| 8,926,082 B2 | 1/2015 | Hiraoka | |
| 8,926,083 B2 | 1/2015 | Hiraoka | |
| 8,926,084 B2 | 1/2015 | Hiraoka | |
| 9,068,094 B2 | 6/2015 | Hiraoka | |
| 9,120,946 B2 | 9/2015 | Seno et al. | |
| 9,428,665 B2 | 8/2016 | Hiraoka | |
| 10,604,666 B2 * | 3/2020 | Hirade | ................... B29C 64/165 |
| 2010/0041784 A1 | 2/2010 | Loccufier | |
| 2011/0223395 A1 | 9/2011 | Shimohara | |
| 2012/0147103 A1 | 6/2012 | Hasaegawa et al. | |
| 2012/0200648 A1 | 8/2012 | Hiraoka et al. | |
| 2012/0242768 A1 | 9/2012 | Seno et al. | |
| 2013/0216945 A1 * | 8/2013 | Konno | ...................... C08K 5/53 |
| | | | 430/105 |
| 2013/0321539 A1 | 12/2013 | Hiraoka | |
| 2014/0130709 A1 | 5/2014 | Omata | |

(Continued)

FOREIGN PATENT DOCUMENTS

| | | |
|---|---|---|
| EP | 2412764 | 2/2012 |
| JP | 2003-321629 A | 11/2003 |

(Continued)

OTHER PUBLICATIONS

Office Action dated Oct. 1, 2019, in Japanese Patent Application No. 2015-223940, filed Nov. 16, 2015, citing CO therein (with English Translation).

(Continued)

*Primary Examiner* — Jessica Whiteley
(74) *Attorney, Agent, or Firm* — Grüneberg and Myers PLLC

(57) ABSTRACT

A curable composition containing a magenta pigment; a polymerizable compound; and a polymer including an amino group, where the polymer including the amino group has a weight average molecular weight of 1,000 or more, wherein the polymer including the amino group is at least one selected from the group consisting of hydroxyl group-including carboxylate ester, salts of a long-chain polyamino amide and acid ester having a high molecular weight, salts of polycarboxylic acid having a high molecular weight, salts of long-chain polyaminoamide and polar acid ester, unsaturated acid esters having a high molecular weight, modified polyurethanes, modified polyacrylates, polyether ester anionic surfactants, salts of naphthalenesulfonic acid formalin condensates, polyoxyethylene alkyl phosphoric acid ester, polyoxyethylene nonylphenylether, polyester polyamine, and stearylamine acetate.

20 Claims, 2 Drawing Sheets

(56) References Cited

U.S. PATENT DOCUMENTS

| | | |
|---|---|---|
| 2014/0224150 A1 | 8/2014 | Konda |
| 2014/0240414 A1 | 8/2014 | Hiraoka |
| 2014/0336298 A1 | 11/2014 | Hiraoka |
| 2014/0338562 A1 | 11/2014 | Hiraoka |
| 2015/0009265 A1 | 1/2015 | Kohzuki et al. |
| 2015/0030825 A1 | 1/2015 | Ishima |
| 2015/0042731 A1 | 2/2015 | Hiraoka |
| 2015/0077481 A1 | 3/2015 | Yoshino et al. |
| 2015/0099819 A1 | 4/2015 | Hiraoka |
| 2015/0126636 A1 | 5/2015 | Hiraoka |
| 2015/0130878 A1 | 5/2015 | Kohzuki et al. |
| 2015/0232675 A1 | 8/2015 | Yoshino et al. |
| 2015/0232676 A1 | 8/2015 | Hiraoka |
| 2015/0232677 A1 | 8/2015 | Hiraoka |
| 2015/0329729 A1 | 11/2015 | Hiraoka |
| 2016/0009931 A1 | 1/2016 | Kohzuki et al. |
| 2016/0075895 A1 | 3/2016 | Kohzuki et al. |
| 2016/0102216 A1 | 4/2016 | Hirade et al. |
| 2016/0257818 A1 | 9/2016 | Mezaki et al. |
| 2016/0257831 A1 | 9/2016 | Hirade et al. |
| 2016/0347959 A1* | 12/2016 | Goi .................. C09D 11/38 |
| 2017/0137643 A1* | 5/2017 | Hirade ............... C09D 133/14 |
| 2018/0171037 A1* | 6/2018 | Miyano .............. C09D 11/101 |

FOREIGN PATENT DOCUMENTS

| | | |
|---|---|---|
| JP | 2005-263898 | 9/2005 |
| JP | 2006-257155 | 9/2006 |
| JP | 2007-169543 A | 7/2007 |
| JP | 2008-285677 A | 11/2008 |
| JP | 2009-215380 | 9/2009 |
| JP | 2012-025913 | 2/2012 |
| JP | 2012-214603 | 11/2012 |
| JP | 2013-112691 | 6/2013 |
| JP | 2013-203846 A | 10/2013 |
| WO | WO 2007/029448 A1 | 3/2007 |
| WO | WO 2015/129815 A1 | 9/2015 |
| WO | WO-2015151833 A1 * | 10/2015 ............ B41J 11/002 |

OTHER PUBLICATIONS

Information Offer Form issued Dec. 24, 2019, in Japanese Patent Application No. 2015-223940, filed Nov. 16, 2015 (with English Translation), citing document CP therein.

Information Offer Form issued Jan. 7, 2020, in Japanese Patent Application No. 2015-223940, filed Nov. 16, 2015 (with English Translation), citing documents CP-CT therein.

Office Action dated Apr. 7, 2020 in corresponding Japanese Patent Application No. 2015-223940, 3 pages.

Japanese Decision of Rejection dated Sep. 29, 2020 in Japanese Application 2015-223940 with translation.

Japanese Information Offer Fom dated Jul. 1, 2020 in Japanese Application No. 2015-223940 with translation.

* cited by examiner

ACTIVE-ENERGY-RAY-CURABLE COMPOSITION, ACTIVE-ENERGY-RAY-CURABLE INK, COMPOSITION STORED CONTAINER, TWO-DIMENSIONAL OR THREE-DIMENSIONAL IMAGE FORMING METHOD, TWO-DIMENSIONAL OR THREE-DIMENSIONAL IMAGE FORMING APPARATUS, AND PROCESSED PRODUCT

CROSS-REFERENCE TO RELATED APPLICATIONS

The present application is a continuation of U.S. patent application Ser. No. 15/351,974, filed on Nov. 15, 2016, which claims priority under 35 U.S.C. § 119 to Japanese Patent Application No. 2015-223940, filed Nov. 16, 2015. The contents of which are incorporated herein by reference in their entirety.

BACKGROUND OF THE INVENTION

Field of the Invention

The present disclosure relates to an active-energy-ray-curable composition, an active-energy-ray-curable ink, a composition stored container storing the composition, a two-dimensional or three-dimensional image forming method and apparatus using the same, and a processed product obtained by processing the formed image.

Description of the Related Art

Active-energy-ray-curable inkjet recording systems require no solvent. Therefore, the active-energy-ray-curable inkjet recording systems do not generate volatile organic compounds (which may be referred to as "VOCs") environmentally advantageously, do achieve rapid drying, and can be used for recording even on liquid non-absorbable recording media that do not absorb an ink.

Inks that are active-energy-ray-curable compositions have increasingly been required to be pigment-based inks in terms of various kinds of durability. However, the pigments are required to be uniformly dispersed in the inks. Reduction in dispersibility of the pigments results in reduction in liquid permeability upon filtration of inks and reduction in ejecting ability (e.g., nozzle clogging).

Methods for dispersing pigments include covering pigments with resins or addition of dispersants. For example, Japanese Unexamined Patent Application Publication No. 2005-263898 has proposed an ultraviolet-curable inkjet ink excellent in ejecting ability and storage ability and including a free, high-molecular-weight dispersant, which is not adsorbed onto the pigment, in an amount of 1.0% by mass or less relative to the total amount of the ink.

Moreover, Japanese Unexamined Patent Application Publication No. 2009-215380 has proposed a colored fine composite coloring material having the following properties. The colored fine composite coloring material serves as a transparent coloring composition for color filters excellent in dispersability and has a primary particle diameter of 50 nm or less. In addition, an amount of the dispersant adsorbed onto the surface of the colored fine composite coloring material is from 5.1 mg/m² through 50.0 mg/m².

SUMMARY OF THE INVENTION

According to one aspect of the present disclosure, an active-energy-ray-curable composition includes: a magenta pigment; a polymerizable compound; and a pigment adsorption component. An amount of the pigment adsorption component ($A_O$) adsorbed onto 100 mg of the magenta pigment is from 10 mg through 60 mg.

DESCRIPTION OF THE EMBODIMENTS (Active-Energy-Ray-Curable Composition)

Figure 1:
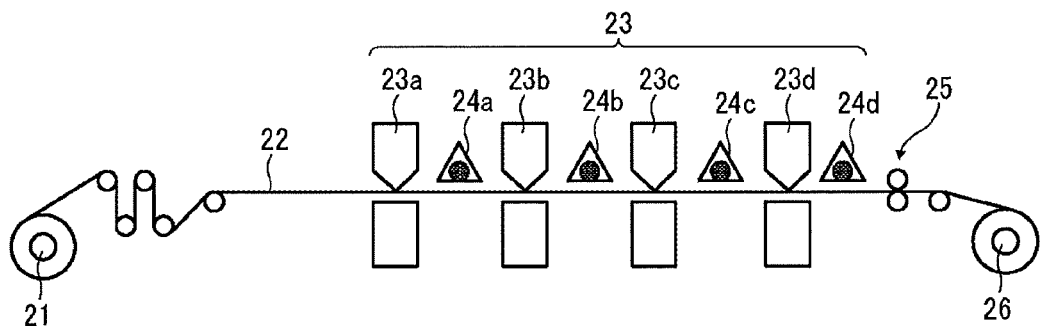
FIG. 1 is a schematic view of an example of an image forming apparatus of the present disclosure.

An active-energy-ray-curable composition of the present disclosure includes a magenta pigment, a polymerizable compound, and a pigment adsorption component, and further includes a dispersant polymer, a polymerization initiator, a polymerization accelerator, and other components if necessary.

The active-energy-ray-curable composition of the present disclosure is based on the finding that the existing techniques have not yet realized an active-energy-ray-curable composition achieving dispersion stability, liquid permeability, and ejecting ability at high levels.

The present invention has an object to provide an active-energy-ray-curable composition excellent in pigment dispersion stability, liquid permeability, and ejecting ability when a magenta pigment is used as a colorant.

According to the present disclosure, it is possible to provide an active-energy-ray-curable composition excellent in pigment dispersion stability, liquid permeability, and ejecting ability when a magenta pigment is used as a colorant.

In the active-energy-ray-curable composition of the present disclosure, an amount of the pigment adsorption component ($A_O$) adsorbed onto 100 mg of the magenta pigment is from 10 mg through 60 mg, preferably from 15 mg through 50 mg, more preferably from 20 mg through 40 mg. When the amount of the pigment adsorption component is 10 mg or more, favorable dispersion stability can be obtained due to the steric repulsion effect. When the amount of the pigment adsorption component is 60 mg or less, an amount of a pigment non-adsorption component (which means a component not adsorbed onto the pigment) is small, resulting in favorable liquid permeability and favorable ejecting ability. It is believed that the pigment non-adsorption component is one factor in increasing thixotropy of inks. An increase in thixotropy results in reduction in liquid permeability upon filtration of the ink. Moreover, generation of dirt of nozzles, which is caused by mist, may deteriorate the ink in ejecting ability.

Examples of the pigment adsorption component (which means a component adsorbed onto the pigment) include dispersant polymers and resin components covering pigments. Dispersant polymers are preferable. The amount of the pigment adsorption component depends on particle diameters of pigments, conditions of surface treatments, and dispersion conditions in addition to amounts of dispersant polymers, acid values, and amine values.

In order to adjust the amount of the pigment adsorption component ($A_O$) adsorbed onto 100 mg of the magenta pigment to be from 10 mg through 60 mg, the following methods are specifically presented.

As the magenta pigment, the surface of the magenta pigment is preferably treated with an acid.

The acid treatment allows a basic dispersant polymer to be easily adsorbed onto the pigment, which can result in improvement of dispersibility by the steric repulsion effect.

When the dispersant polymer includes a basic, polar functional group, the dispersant polymer can be easily adsorbed onto the surface of the magenta pigment, resulting in improvement of dispersion stability. The basic, polar functional group of the dispersant polymer is preferably an amino group in terms of adsorption ability, dispersibility in photopolymerizable monomers, and ability to lower viscosity.

An amine value of the dispersant polymer is preferably 10 mg KOH/g or more but 30 mg KOH/g or less, more preferably 15 mg KOH/g or more but 30 mg KOH/g or less. An amount of the dispersant polymer is preferably 20% by mass or more but 70% by mass or less, more preferably 30% by mass or more but 60% by mass or less, relative to the total amount of the magenta pigment.

An effective dispersion method is as follows. The main dispersion is performed under such a condition that a target concentration of the pigment in a dispersion liquid is about twice, where the pigment is dispersed at a high concentration. The obtained dispersion liquid is diluted to the target concentration of the pigment with a dispersion medium before the dispersion liquid is used. It is expected that under such a condition that the pigment is dispersed at a high concentration, a ratio of the pigment to the dispersant polymer is high, and thus the number of times at which the dispersant polymer contacts with the pigment increases to facilitate adsorption of the dispersant polymer onto the pigment.

An amount of the dispersant polymer of the active-energy-ray-curable composition is preferably 20% by mass or more but 70% by mass or less, more preferably 30% by mass or more but 60% by mass or less, relative to the total amount of the magenta pigment. The amount of the dispersant polymer being 20% by mass or more makes it possible to secure dispersibility because the dispersant polymer adsorbed onto the pigment generates the steric repulsion effect. When the amount of the dispersant polymer is 70% by mass or less, an amount of a free dispersant polymer not adsorbed onto the magenta pigment is small, which can result in low viscosity of the ink. Moreover, when the amount of the free dispersant polymer is small, the ink is prevented from increasing thixotropy, resulting in improvement of liquid permeability and ejecting ability. In addition, the amount of the free dispersant affects physical properties of coated films. A small amount of the free dispersant polymer makes it possible to relatively reduce curing-preventing components in the coated film, and thus curing ability and close adhesiveness to a substrate are expected to be improved.

An amount of the pigment non-adsorption component, which is not adsorbed onto the magenta pigment, is preferably 1% by mass or less, more preferably 0.8% by mass or less, relative to the total amount of the active-energy-ray-curable composition.

When an amount of the pigment adsorption component adsorbed onto 100 mg of the magenta pigment after the active-energy-ray-curable composition of the present disclosure is left to stand at 70° C. for 14 days is defined as A, a percentage of change in the amount of the pigment adsorption component (ΔA) as determined by Formula (1) below is preferably within ±20%. It is believed that when the ΔA is within ±20%, the percentage of change in the adsorption component is small, and favorable dispersion stability generated by the steric repulsion effect is exhibited. At the same time, favorable liquid permeability and favorable ejecting ability can be achieved without increasing the pigment non-adsorption component.

$$\Delta A\ (\%) = (A - A_O)/A_O \times 100 \quad (1)$$

The amount of the pigment adsorption component ($A_O$) adsorbed onto 100 mg of the magenta pigment can be evaluated in the following manner.

First, a target ink (1 mL) is charged into a tube for centrifugal separation and is separated into a precipitated solid component (e.g., a pigment) and a supernatant liquid using a centrifugal separator (device name: tabletop high-speed microcentrifuge CT 13 model, available from Hitachi Koki Co., Ltd., conditions: 13,000 rpm, 90 minutes). After the supernatant liquid is removed, acetone is added to the precipitated solid component so as to be 1 mL in total. The precipitated solid component is pulverized using a spatula and is subjected to ultrasonic dispersion for 20 minutes. The washing step (centrifugal separation and addition of acetone) is repeated four times to remove the supernatant liquid to obtain a precipitated solid component. Note that, the number of the washings is determined after an amount of a non-volatile component in the supernatant liquid is confirmed. Acetone is completely removed from the obtained precipitated solid component under reduced pressure at 25° C., to take out a magenta pigment onto which the pigment adsorption component (e.g., dispersant polymer) is adsorbed. The obtained magenta pigment (100 mg) is baked in an electric furnace (device name: ROP-001, available from AS ONE Corporation, conditions: 400° C., 60 minutes). A difference in mass between the magenta pigment onto which the pigment adsorption component is adsorbed after baking and the magenta pigment onto which the pigment adsorption component is adsorbed before baking is defined as the amount of the pigment adsorption component.

<Magenta Pigment>

The magenta pigment is not particularly limited and may be appropriately selected depending on the intended purpose.

A number average primary particle diameter of the magenta pigment is preferably 50 nm or more but 200 nm or less, more preferably 70 nm or more but 180 nm or less. When the number average primary particle diameter of the magenta pigment is 50 nm or more but 200 nm or less, the magenta pigment can be improved in dispersibility. Note that, the number average primary particle diameter can be determined by a scanning electron microscope (device name: SU3500, available from Hitachi High-Technologies Corporation) in the following manner. Unidirectional particle diameters of the primary particles (200 particles or more but 500 particles or less) are measured at ×10,000 magnification, and the obtained unidirectional particle diameters are used to calculate an average value of the primary particle diameter in cumulative distribution, each of the primary particles being sandwiched by two parallel lines.

Examples of the magenta pigment include quinacridone pigments. The quinacridone pigments have a wide range of color tones, high colorability, and top-grade robustness property. Therefore, the quinacridone pigments can be widely used for applications even under severe outdoor conditions.

Examples of the quinacridone pigments include C. I. Pigment Red 122, C. I. Pigment Violet 19, and C. I. Pigment Red 202. Among them, at least one of the C. I. Pigment Red 122 is preferably incorporated into the magenta pigment in terms of color property and weatherability. Moreover, the magenta pigment may include two or more quinacridone pigments or a mixed crystal pigment.

In order to obtain favorable dispersibility, the surface of the magenta pigment is preferably treated with an acid. The acid treatment allows a basic dispersant polymer to be easily adsorbed onto the pigment, which can result in improvement of dispersibility by the steric repulsion effect.

A method of the surface treatment is not particularly limited and may be appropriately selected depending on the intended purpose. Examples of the method include known methods such as pigment-derivative treatments, resin coating treatments, acid treatments, and plasma treatments.

As the magenta pigment, commercially available products can be used. Examples of the commercially available products include product name: EBTRANSP (C. I. Pigment Red 122, available from Clariant (Japan) K.K., surface treatment: derivative), product name: RGT (C. I. Pigment Red 122, available from DIC Corporation, surface treatment: derivative), E2Y (C. I. Pigment Red 122, available from Clariant (Japan) K.K., surface treatment: additive), product name: SD108 (C. I. Pigment Red 122, available from SANYO COLOR WORKS, Ltd., surface treatment: acid), and product name: RFS (C. I. Pigment Red 122/C. I. Pigment Violet 19, available from DIC Corporation, surface treatment: derivative). These may be used alone or in combination.

An amount of the magenta pigment is preferably 1% by mass or more but 5% by mass or less relative to the total amount of the active-energy-ray-curable composition. When the amount of the magenta pigment is 1% by mass or more, the active-energy-ray-curable composition can be improved in colorability. When the amount of the magenta pigment is 5% by mass or less, the active-energy-ray-curable composition can be prevented from increasing viscosity, resulting in improvement of ejecting ability.

<Polymerizable Compounds>

The polymerizable compounds are not particularly limited and may be appropriately selected depending on the intended purpose, so long as they are polymerizable by active energy rays (e.g., ultraviolet rays and electron beams). These may be used alone or in combination in order to adjust reaction speed, ink properties, and physical properties of the cured film.

Examples of the polymerizable compound include radically polymerizable compounds.

Examples of the radically polymerizable compounds include (meth)acrylate compounds, (meth)acrylamide compounds, and aromatic vinyl compounds. These may be used alone or in combination. Note that, in the present specification, (meth)acrylate means at least one of acrylate and methacrylate, and (meth)acryl means at least one of acryl and methacryl.

<<(Meth)Acrylate Compounds>>

Examples of the (meth)acrylate compounds include monofunctional (meth)acrylates, bifunctional (meth)acrylates, trifunctional (meth)acrylates, tetrafunctional (meth)acrylates, pentafunctional (meth)acrylates, and hexafunctional (meth)acrylates. These may be used alone or in combination.

Examples of the monofunctional (meth)acrylates include hexyl (meth)acrylate, 2-ethylhexyl (meth)acrylate, tert-octyl (meth)acrylate, isoamyl (meth)acrylate, decyl (meth)acrylate, isodecyl (meth)acrylate, stearyl (meth)acrylate, isostearyl (meth)acrylate, cyclohexyl (meth)acrylate, 4-n-butylcyclohexyl (meth)acrylate, bornyl (meth)acrylate, isobornyl (meth)acrylate, benzyl (meth)acrylate, butoxyethyl (meth) acrylate, 2-chloroethyl (meth)acrylate, 4-bromobutyl (meth) acrylate, cyanoethyl (meth)acrylate, butoxymethyl (meth) acrylate, 3-methoxybutyl (meth)acrylate, alkoxymethyl (meth)acrylate, alkoxyethyl (meth)acrylate, 2-(2-methoxyethoxy)ethyl (meth)acrylate, 2-(2-butoxyethoxy)ethyl (meth)acrylate, 2,2,2-tetrafluoroethyl (meth)acrylate, 1H,1H,2H,2H-perfluorodecyl (meth)acrylate, 4-butylphenyl (meth)acrylate, phenyl (meth)acrylate, 2,4,5-tetramethylphenyl (meth)acrylate, 4-chlorophenyl (meth)acrylate, phenoxymethyl (meth)acrylate, phenoxyethyl (meth)acrylate, glycidyl (meth)acrylate, glycidyloxy butyl (meth)acrylate, glycidyloxy ethyl (meth)acrylate, glycidyloxy propyl (meth)acrylate, tetrahydrofurfuryl (meth)acrylate, hydroxyalkyl (meth)acrylate, 2-hydroxyethyl (meth)acrylate, 3-hydroxypropyl (meth)acrylate, 2-hydroxypropyl (meth)acrylate, 2-hydroxybutyl (meth)acrylate, 4-hydroxybutyl (meth) acrylate, dimethylaminoethyl (meth)acrylate, diethylaminoethyl (meth)acrylate, dimethylaminopropyl (meth)acrylate, diethylaminopropyl (meth)acrylate, trimethoxysilylpropyl (meth)acrylate, trimethylsilylpropyl (meth)acrylate, polyethylene oxide monomethyl ether (meth)acrylate, origoethylene oxide monomethyl ether (meth)acrylate, polyethylene oxide (meth)acrylate, origoethylene oxide (meth)acrylate, origoethylene oxide monoalkyl ether (meth)acrylate, polyethylene oxide monoalkyl ether (meth)acrylate, dipropylene glycol (meth)acrylate, polypropylene oxide monoalkyl ether (meth)acrylate, oligopropylene oxide monoalkyl ether (meth)acrylate, 2-methacryloyloxyethyl succinic acid, 2-methacryloyloxy hexahydrophthalic acid, 2-methacryloyloxyethyl-2-hydroxypropyl phthalate, butoxydiethylene glycol (meth)acrylate, trifluoroethyl (meth)acrylate, perfluorooctyethyl (meth)acrylate, 2-hydroxy-3-phenoxypropyl (meth)acrylate, ethylene oxide-modified phenol (meth)acrylate, ethylene oxide-modified cresol (meth)acrylate, ethylene oxide-modified nonylphenol (meth)acrylate, propylene oxide-modified nonylphenol (meth)acrylate, ethylene oxide-modified-2-ethylhexyl (meth)acrylate, and (meth)acrylic acid-2-(2-vinyloxyethoxy)ethyl. These may be used alone or in combination. Among them, phenoxyethyl (meth)acrylate, benzyl (meth) acrylate, (meth)acrylic acid-2-(2-vinyloxyethoxy)ethyl, 2-hydroxyethyl (meth)acrylate, 3-hydroxypropyl (meth) acrylate, 2-hydroxypropyl (meth)acrylate, 4-hydroxybutyl (meth)acrylate, and isobornyl (meth)acrylate are preferable in terms of low viscosity, low odor, and high curing ability; and phenoxyethyl (meth)acrylate, benzyl (meth)acrylate, (meth)acrylic acid-2-(2-vinyloxyethoxy)ethyl, and isobornyl (meth)acrylate are particularly preferable because these compounds have a good compatibility with photopolymerization initiators and other monomers.

Examples of the bifunctional (meth)acrylates include 1,6-hexanediol di(meth)acrylate, 1,10-decanediol di(meth)acrylate, neopentyl glycol di(meth)acrylate, 2,4-dimethyl-1,5-pentanediol di(meth)acrylate, butylethyl propanediol di(meth)acrylate, ethoxylated cyclohexanemethanol di(meth)acrylate, polyethylene glycol di(meth)acrylate, oligoethylene glycol di(meth)acrylate, ethylene glycol di(meth)acrylate, 2-ethyl-2-butyl-butanediol di(meth)acrylate, hydroxypivalic acid neopentylglycol di(meth)acrylate, ethylene oxide-modified bisphenol A di(meth)acrylate, bisphenol F polyethoxy di(meth)acrylate, polypropylene glycol di(meth)acrylate, oligopropylene glycol di(meth)acrylate, 1,4-butanediol di(meth)acrylate, 2-ethyl-2-butylpropanediol di(meth)acrylate, 1,9-nonane di(meth)acrylate, 1,9-nonanediol di(meth)acrylate, propoxylated ethoxylated bisphenol A di(meth)acrylate, and tricyclodecane di(meth)acrylate. These may be used alone or in combination.

Examples of the trifunctional (meth)acrylates include trimethylolpropane tri(meth)acrylate, trimethylolethane tri (meth)acrylate, alkylene oxide-modified tri(meth)acrylate of trimethylolpropane, pentaerythritol tri(meth)acrylate, dipentaerythritol tri(meth)acrylate, trimethylolpropane tri((meth) acryloyloxy propyl)ether, isocyanuric acid alkylene oxide-modified tri(meth)acrylate, propionic acid dipentaerythritol tri(meth)acrylate, tri((meth)acryloyloxy ethyl) isocyanurate, hydroxy pivalic aldehyde-modified dimethylolpropane tri (meth)acrylate, sorbitol tri(meth)acrylate, propoxylated trimethylolpropane tri(meth)acrylate, and ethoxylated glycerin tri(meth)acrylate. These may be used alone or in combination.

Examples of the tetrafunctional (meth)acrylates include pentaerythritol tetra(meth)acrylate, sorbitol tetra(meth)acrylate, ditrimethylolpropane tetra(meth)acrylate, propionic acid dipentaerythritol tetra(meth)acrylate, and ethoxylated pentaerythritol tetra(meth)acrylate. These may be used alone or in combination.

Examples of the pentafunctional (meth)acrylates include sorbitol penta(meth)acrylate and dipentaerythritol penta(meth)acrylate. These may be used alone or in combination.

Examples of the hexafunctional (meth)acrylates include dipentaerythritol hexa(meth)acrylate, sorbitol hexa(meth) acrylate, alkylene oxide-modified hexa(meth)acrylate of phosphazene, and caprolactone-modified dipentaerythritol hexa(meth)acrylate. These may be used alone or in combination.

<<(Meth)acrylamide Compounds>>

Examples of the (meth)acrylamide compounds include (meth)acrylamide, N-methyl (meth)acrylamide, N-ethyl (meth)acrylamide, N-propyl (meth)acrylamide, N-n-butyl (meth)acrylamide, N-t-butyl (meth)acrylamide, N-butoxymethyl (meth)acrylamide, N-isopropyl (meth)acrylamide, N-methylol (meth)acrylamide, N,N-dimethyl (meth)acrylamide, N,N-diethyl (meth)acrylamide, (meth)acryloyl morpholine, and hydroxyethyl (meth)acrylamide. These may be used alone or in combination. Among them, (meth)acryloyl morpholine is preferable.

<<Aromatic Vinyl Compounds>>

Examples of the aromatic vinyl compounds include styrene, methylstyrene, dimethylstyrene, trimethylstyrene, ethylstyrene, isopropylstyrene, chloromethylstyrene, methoxystyrene, acetoxystyrene, chlorostyrene, dichlorostyrene, bromostyrene, vinyl benzoic acid methylester, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allystyrene, isopropenyl styrene, butenylstyrene, octenylstyrene, 4-t-butoxycarbonyl styrene, 4-methoxystyrene, and 4-t-butoxystyrene. These may be used alone or in combination.

As a dispersion medium used for dispersing the magenta pigment, monofunctional compounds are preferably used in terms of dispersibility and low viscosity. Improvement of dispersibility makes particle diameter distribution uniform. Moreover, reduction in both excessively small particles and aggregated particles can prevent inhibition of absorption of ultraviolet light, and can improve both curing ability and ejecting ability.

Examples of the monofunctional compounds used for the dispersion medium include phenoxyethyl acrylate, acryloyl morpholine, and benzyl acrylate.

As the monofunctional compounds used for the dispersion medium, commercially available products can be used. Examples of the commercially available products include product name: VISCOAT #192 (compound name: phenoxyethyl acrylate, available from Osaka Organic Chemical Industry Ltd., structural formula: the following formula (M-1)), product name: ACMO (compound name: acryloyl morpholine, available from KOHJIN Film & Chemicals Co., Ltd., structural formula: the following formula (M-2)), and product name: VISCOAT #160 (compound name: benzyl acrylate, available from Osaka Organic Chemical Industry Ltd., structural formula: the following formula (M-3)) because dispersion liquids excellent in dispersion stability can be obtained. These may be used alone or in combination.

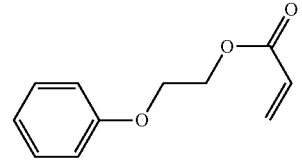

Formula (M-1)

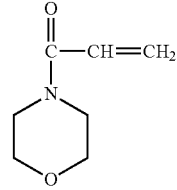

Formula (M-2)

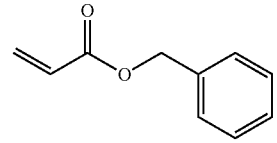

Formula (M-3)

An amount of the polymerizable compound is preferably 50% by mass or more but 95% by mass or less, more preferably 60% by mass or more but 92% by mass or less, particularly preferably 70% by mass or more but 90% by mass or less, relative to the total amount of the active-energy-ray-curable composition.

<Pigment Adsorption Component>

Examples of the pigment adsorption component include dispersant polymers and resin components covering pigments. The dispersant polymers are preferable.

Examples of the dispersant polymers include hydroxyl group-including carboxylate ester, salts of a long-chain polyamino amide and acid ester having a high molecular weight, salts of polycarboxylic acid having a high molecular weight, salts of long-chain polyaminoamide and polar acid ester, unsaturated acid esters having a high molecular weight, modified polyurethanes modified polyacrylates, polyether ester anionic surfactants, salts of naphthalene-sulfonic acid formalin condensates, polyoxyethylene alkyl phosphoric acid ester, polyoxyethylene nonylphenylether, polyester polyamine, and stearylamine acetate. These may be used alone or in combination. When the dispersant polymer is used, the steric repulsion effect achieved by adsorbing the dispersant can be improved, resulting in high dispersion stability. Here, the dispersant polymer means a dispersant polymer having a weight average molecular weight of 1,000 or more. Examples of the basic, polar functional group include an amino group, an imino group, an amide group, an imide group, and a nitrogen-including heterocyclic group.

When the dispersant polymer includes the basic, polar functional group, the dispersant polymer is easily adsorbed onto the surface of the magenta pigment, resulting in improvement of dispersion stability. As the basic, polar functional group of the dispersant polymer, an amino group is preferable in terms of adsorption ability, dispersibility in photopolymerizable monomers, and ability to lower viscosity.

An amine value of the dispersant polymer is preferably 10 mg KOH/g or more but 30 mg KOH/g or less, more preferably 15 mg KOH/g or more but 30 mg KOH/g or less. It is believed that the dispersant having an amine value of 10 mg KOH/g or more but 30 mg KOH/g or less can prevent acceleration of polymerization reaction with the polymerizable compound that is a component in the composition even during long-term storage or under heating. Therefore, it is presumed that the above dispersant can lower the percentage of change in viscosity even during long-term storage or under heating, resulting in high storage stability. The amine value can be determined in the following manner. The dispersant polymer (1 g) is dissolved in methyl isobutyl ketone (100 mL). Then, potentiometric titration is performed using a 0.01 mol/L chloric acid methyl isobutyl ketone solution to measure a potential difference. Based on the obtained potential difference, an amine value can be calculated. Here, an automatic titrator (device name: GT-200, available from Mitsubishi Chemical Analytech, Co., Ltd.) is used for the potentiometric titration.

As the dispersant polymer, commercially available products can be used. Examples of the commercially available products include SOLSPERSE series (available from The Lubrizol Corporation) such as product name: SOLSPERSE 24000 (amine value: 41.6 mg KOH/g), product name: SOLSPERSE 32000 (amine value: 31.2 mg KOH/g), product name: SOLSPERSE 39000 (amine value: 25.7 mg KOH/g), product name: SOLSPERSE J100, and product name: SOLSPERSE J200; DISPER BYK series (available from BYK Japan KK) such as product name: DISPER BYK-162 (amine value: 13 mg KOH/g), product name: DISPER BYK-163 (amine value: 10 mg KOH/g), product name: DISPERBYK-168 (amine value: 11 mg KOH/g), product name: DISPERBYK-2050 (amine value: 30.7 mg KOH/g), and product name: DISPERBYK-2150 (amine value: 56.7 mg KOH/g); BYKJET series (available from BYK Japan KK) such as product name: BYKJET-9151 (amine value: 17.2 mg KOH/g), and product name: BYKJET-9152 (amine value: 27.3 mg KOH/g); and AJISPER series (available from Ajinomoto Fine-Techno Co., Inc.) such as product name: AJISPER PB821 (amine value: 11.2 mg KOH/g), product name: AJISPER PB822 (amine value: 18.2 mg KOH/g), and product name: AJISPER PB881 (amine value: 17.4 mg KOH/g).

As described above, an amount of the dispersant polymer is preferably 20% by mass or more but 70% by mass or less, more preferably 30% by mass or more but 60% by mass or less, relative to the total amount of the magenta pigment. The amount of the dispersant polymer being 20% by mass or more makes it possible to secure dispersibility because the dispersant polymer adsorbed onto the pigment generates the steric repulsion effect. When the amount of the dispersant polymer is 70% by mass or less, an amount of a free dispersant polymer not adsorbed onto the magenta pigment is small, which can result in low viscosity of the ink. Moreover, when the amount of the free dispersant polymer is small, the ink is prevented from increasing thixotropy, resulting in improvement of liquid permeability and ejecting ability. In addition, the amount of the free dispersant affects physical properties of coated films. A small amount of the free dispersant polymer makes it possible to relatively reduce curing-preventing components in the coated film, and thus curing ability and close adhesiveness to a substrate are expected to be improved.

<Active Energy Rays>

Active energy rays used for curing an active-energy-ray-curable composition of the present disclosure are not particularly limited, so long as they are able to give necessary energy for allowing polymerization reaction of polymerizable components in the composition to proceed. Examples of the active energy rays include electron beams, α-rays, β-rays, γ-rays, and X-rays, in addition to ultraviolet rays. When a light source having a particularly high energy is used, polymerization reaction can be allowed to proceed without a polymerization initiator. In addition, in the case of irradiation with ultraviolet ray, mercury-free is preferred in terms of protection of environment. Therefore, replacement with GaN-based semiconductor ultraviolet light-emitting devices is preferred from industrial and environmental point of view. Furthermore, ultraviolet light-emitting diode (UV-LED) and ultraviolet laser diode (UV-LD) are preferable as an ultraviolet light source. Small sizes, long time working life, high efficiency, and high cost performance make such irradiation sources desirable.

<Polymerization Initiator>

The polymerization initiator produces active species such as a radical or a cation upon application of energy of an active energy ray and initiates polymerization of a polymerizable compound (monomer or oligomer). As the polymerization initiator, it is suitable to use a known radical polymerization initiator, cation polymerization initiator, or a combination thereof. Of these, a radical polymerization initiator is preferable. Moreover, an amount of the polymerization initiator is preferably 5% t by mass or more but 20% by mass or less relative to the total amount of the active-energy-ray-curable composition in order to obtain sufficient curing speed.

Specific examples of the radical polymerization initiators include, but are not limited to, aromatic ketones, acylphosphine oxide compounds, aromatic onium chlorides, organic peroxides, thio compounds (thioxanthone compounds, thiophenyl group containing compounds, etc.), hexaaryl biimidazole compounds, ketoxime ester compounds, borate compounds, azinium compounds, metallocene compounds, active ester compounds, compounds having a carbon halogen bond(s), and alkyl amine compounds. These may be used alone or in combination.

In addition, a polymerization accelerator is optionally used together with the polymerization initiator.

The polymerization accelerator is not particularly limited and may be appropriately selected depending on the intended purpose. Examples of the polymerization accelerator include amine compounds such as ethyl p-dimethylaminobenzoate, p-dimethylamino benzoic acid-2-ethylhexyl, methyl p-dimethylaminobenzoate, benzoic acid-2-dimethylaminoethyl, and butoxyethyl p-dimethylaminobenzoate. These may be used alone or in combination.

<Other Components>

The other components are not particularly limited and may be appropriately selected depending on the intended purpose. Examples of the other components include conventionally known other colorants, organic solvents, polymerization inhibitors, slipping agents (surfactants), permeation enhancing agents, wetting agents (humectants), fixing agents, fungicides, preservatives, antioxidants, ultraviolet absorbents, chelate agents, pH adjusters, and thickeners.

<<Other Colorants>>

As the other colorants, other pigments and dyes that impart various gloss colors (e.g., black, white, cyan, yellow, green, orange, gold, and silver) to the composition can be used depending on the purposes and demanded properties of the active-energy-ray-curable composition in the present disclosure. An amount of the other colorants is preferably 0.1% by mass or more but 20% by mass or less, more preferably 1% by mass or more but 10% by mass or less, relative to the total amount of the active-energy-ray-curable composition.

Examples of the other pigments include inorganic pigments and organic pigments. These may be used alone or in combination.

As the inorganic pigments, carbon blacks (C.I. Pigment Black 7) such as Furnace black, Lamp black, acetylene black, and Channel black; iron oxide; and titanium oxide can be used.

Examples of the organic pigments include azo pigments (e.g., insoluble azo pigments, condensed azo pigments, azo lakes, and chelate azo pigments), polycyclic pigments (e.g., phthalocyanine pigments, perylene pigments, perinone pigments, anthraquinone pigments, dioxane pigments, thioindigo pigments, isoindolinone pigments, and quinophthalone pigments), dye chelates (e.g., basic dye chelates and acid dye chelates), dye lakes (e.g., basic dye lakes and acid dye lakes), nitro pigments, nitroso pigments, aniline blacks, and daylight fluorescent pigments.

The dyes are not particularly limited and may be appropriately selected depending on the intended purpose, but acid dyes, direct dyes, reactive dyes, and basic dyes can be used. These may be used alone or in combination.

<<Polymerization Inhibitors>>

Examples of the polymerization inhibitors include 4-methoxy-1-naphthol, methylhydroquinone, hydroquinone, t-butylhydroquinone, di-t-butylhydroquinone, methoquinone (hydroquinone mono methylether), 2,2'-dihydroxy-3,3'-di(α-methylcyclohexyl)-5,5'-dimethyldiphenylmethane, p-benzoquinone, di-t-butyldiphenylamine, 9,10-di-n-butoxyanthracene, and 4,4'-[1,10-dioxo-1,10-decanediylbis(oxy)]bis[2,2,6,6-tetramethyl]-1-piperidinyloxy.

An amount of the polymerization inhibitor is preferably 0.005% by mass or more but 3% by mass or less relative to the total amount of the polymerization initiator. When the amount of the polymerization inhibitor is 0.005% by mass or more, the resultant composition can be improved in storage stability, and can be prevented from raising viscosity under high temperature environment. When the amount of the polymerization inhibitor is 3% by mass or less, the resultant composition can be improved in curing ability.

<<Surfactants>>

The surfactants are not particularly limited and may be appropriately selected depending on the intended purpose. Examples of the surfactants include higher fatty acid surfactants, silicone surfactants, and fluorine surfactants.

An amount of the surfactant is preferably 0.1% by mass or more but 3% by mass or less, more preferably 0.2% by mass or more but 1% by mass or less, relative to the total amount of the active-energy-ray-curable composition. When the amount of the surfactant is 0.1% by mass or more, the resultant composition can be improved in wettability. When the amount of the surfactant is 3% by mass or less, the resultant composition can be improved in curing ability. When the amount of the surfactant falls within the more preferable range, the resultant composition can be improved in wettability and leveling property.

<Organic Solvent>

The active-energy-ray-curable composition of the present disclosure optionally contains an organic solvent although it is preferable to spare it. The curable composition free of an organic solvent, in particular volatile organic compound (VOC), is preferable because it enhances safety at where the composition is handled and makes it possible to prevent pollution of the environment. Incidentally, the organic solvent represents a conventional non-reactive organic solvent, for example, ether, ketone, xylene, ethyl acetate, cyclohexanone, and toluene, which is clearly distinguished from reactive monomers. Furthermore, "free of" an organic solvent means that no organic solvent is substantially contained. The content thereof is preferably less than 0.1 percent by mass.

<Dispersion Method>

As a method for dispersing the active-energy-ray-curable composition of the present disclosure, dispersing devices using media such as ball mills, sand mills, and bead mills may be used, and medialess dispersion devices may be also used. Here, an effective dispersion method is as follows. The main dispersion is performed under such a condition that a target concentration of the pigment in a dispersion liquid is about twice, where the pigment is dispersed at a high concentration. The obtained dispersion liquid is diluted to the target concentration of the pigment with a dispersion medium before the dispersion liquid is used. It is expected that under such a condition that the pigment is dispersed at a high concentration, a ratio of the pigment to the dispersant polymer is high, and thus the number of times at which the dispersant polymer contacts with the pigment increases to facilitate adsorption of the dispersant polymer onto the pigment.

As the dispersion media used in the dispersing device using media, zirconia beads are preferably used in terms of dispersibility and dispersion efficiency. These dispersion methods may be used in combination. For example, when ball mills are used for dispersion, a two-step dispersion makes it possible to obtain a dispersion liquid having a uniform particle size distribution, the two-step dispersion including a step of dispersing materials using zirconia beads having a diameter of 5 mm, and a step of dispersing the materials using zirconia beads having a diameter of 1 mm.

The medialess dispersion device does not excessively apply energy to the pigment, and thus pigment particles are not fractured. As a result, adsorption of the dispersant polymers onto the surfaces of the pigment particles is promoted, resulting in improvement of dispersion stability. Moreover, the medialess dispersion device prevents excessive dispersion and contamination caused by media. Therefore, a system in the device can be prevented from occurrence of fine particles and coarse particles. This can improve the ink in uniformity of particle size distribution, which results in high ejecting ability of the ink.

Examples of the medialess dispersion device include dispersing devices using high-speed shear force (e.g., collision dispersion and ultrasonic dispersion) and dispersion devices using high-speed stirring.

Examples of the dispersing device using high-speed shear force include device name: NANO VATER series laboratory device C-ES008 (available from YOSHIDA KIKAI CO., LTD.).

A temperature of the dispersion liquid under dispersing is preferably 5° C. or more but 60° C. or less. When the temperature of the dispersion liquid is 5° C. or more but 60° C. or less, curing reaction of the monomer can be prevented. In order to prevent the curing reaction, a small amount of the polymerization inhibitor can be added to the dispersion liquid in advance.

In the present disclosure, it is preferable that a 50% cumulative volume particle diameter of the active-energy-ray-curable composition be 80 nm or more but 180 nm or less and a distribution width of a particle size distribution determined by the following Formula (2) be 90 nm or less.

$$\text{Distribution width of particle size distribution} = (84\% \text{ cumulative volume particle diameter} - 16\% \text{ cumulative volume particle diameter})/2 \quad \text{Formula (2)}$$

When the 50% cumulative volume particle diameter is 80 nm or more but 180 nm or less, effects of improvement of dispersibility, liquid permeability, and ejecting ability are realized.

When the distribution width of a particle size distribution determined by the above Formula (2) is 90 nm or less, the distribution of dispersed particle sizes becomes sharp, realizing effects such as improvement of liquid permeability and improvement of ejecting ability.

The 50% cumulative volume particle diameter is more preferably 90 nm or more but 170 nm or less.

The distribution width of a particle size distribution determined by the above Formula (2) is still more preferably 80 nm or less.

Here, the 50% cumulative volume particle diameter ($D_{50}$) and the distribution width of a particle size distribution can be determined in the following manners.

The obtained active-energy-ray-curable composition is about 500-fold diluted in the polymerizable compound used as the dispersion medium to measure the 50% cumulative volume particle diameter ($D_{50}$) using a particle size analyzer (product name: UPA150, available from NIKKISO CO., LTD.).

The distribution width of a particle size distribution is determined based on the above Formula (2). Here, the 84% cumulative volume particle diameter ($D_{84}$) and the 16% cumulative volume particle diameter ($D_{16}$) in the Formula (2) are measured in the same manner as in the measurement of the 50% cumulative volume particle diameter ($D_{50}$).

<Viscosity>

The viscosity of the active-energy-ray-curable composition of the present disclosure has no particular limit because it can be adjusted depending on the purpose and application devices. For example, if an ejecting device that ejects the composition from nozzles is employed, the viscosity thereof is preferably in the range of 3 mPa·s to 40 mPa·s, more preferably 5 mPa·s to 15 mPa·s, and particularly preferably 6 mPa·s to 12 mPa·s in the temperature range of 20 degrees C. to 65 degrees C., preferably at 25 degrees C. In addition, it is particularly preferable to satisfy this viscosity range by the composition free of the organic solvent described above. Incidentally, the viscosity can be measured by a cone plate rotary viscometer (VISCOMETER TVE-22L, manufactured by TOKI SANGYO CO., LTD.) using a cone rotor (1° 34'×R24) at a number of rotation of 50 rpm with a setting of the temperature of hemathermal circulating water in the range of 20 degrees C. to 65 degrees C. VISCOMATE VM-150III can be used for the temperature adjustment of the circulating water.

A percentage of change in viscosity of the active-energy-ray-curable composition is preferably 15% or less, more preferably 10% or less, particularly preferably 5% or less. When the percentage of change in viscosity is 15% or less, the active-energy-ray-curable composition can be excellent in storage stability and can be improved in dispersibility. Here, the percentage of change in viscosity can be determined by the following Formula (3). A viscosity in the percentage of change in viscosity can be measured using a cone plate rotary viscometer (device name: VISCOMETER TV-22, available from Toki Sangyo Co., Ltd.) under the following conditions: temperature of circulating water having a constant temperature: 25° C.; number of rotations: 50 rpm; and shear velocity: 191.4 sec$^{-1}$.

$$\text{Percentage of change in viscosity (\%)} = ((\text{viscosity after storage at } 70° \text{C. for 14 days} - \text{initial viscosity})/\text{initial viscosity}) \times 100 \quad \text{Formula (3)}$$

<Application Field>

The application field of the active-energy-ray-curable composition of the present disclosure is not particularly limited. It can be applied to any field where active-energy-ray-curable compositions are used. For example, the curable composition is selected to a particular application and used for a resin for processing, a paint, an adhesive, an insulant, a releasing agent, a coating material, a sealing material, various resists, and various optical materials.

Figure 2:
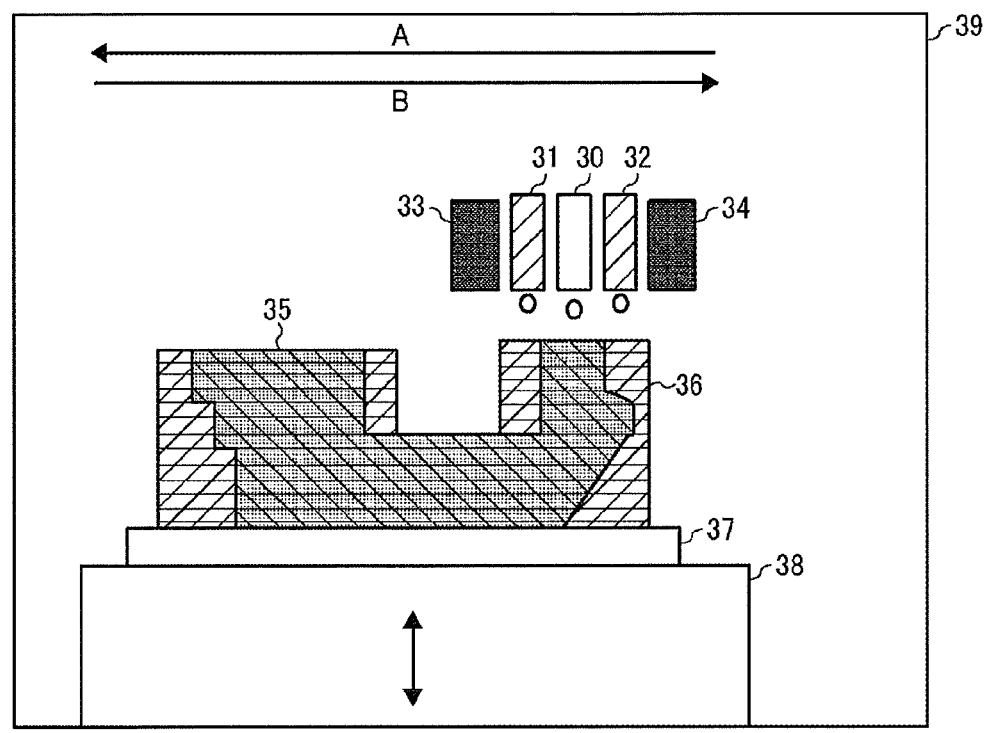
FIG. 2 is a schematic view of an example of another image forming apparatus of the present disclosure.
Figure 3A:
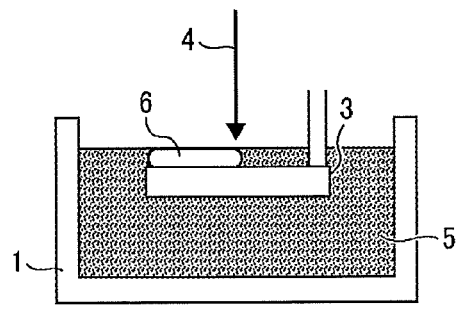
FIG. 3A is a schematic view of an example of still another image forming apparatus of the present disclosure.
Figure 3B:
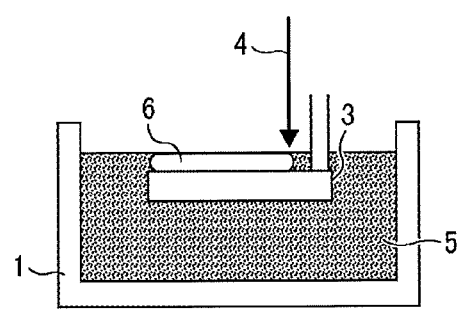
FIG. 3B is a schematic view of an example of still another image forming apparatus of the present disclosure.
Figure 3C:
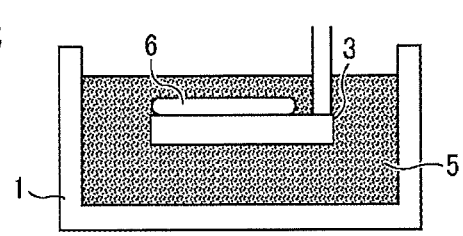
FIG. 3C is a schematic view of an example of still another image forming apparatus of the present disclosure.
Figure 3D:
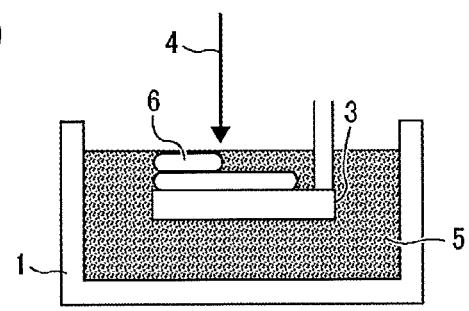
FIG. 3D is a schematic view of an example of still another image forming apparatus of the present disclosure.

Furthermore, the active-energy-ray-curable composition of the present disclosure can be used as an ink to form two-dimensional texts, images, and designed coating film on various substrates and in addition as a solid object forming material to form a three-dimensional object. This three dimensional object forming material may also be used as a binder for powder particles used in a powder layer laminating method of forming a three-dimensional object by repeating curing and layer-forming of powder layers, and as a three-dimensional object constituent material (a model material) and a supporting member used in an additive manufacturing method (a stereolithography method) as illustrated in FIG. 2, FIG. 3A, FIG. 3B, FIG. 3C, and FIG. 3D. FIG. 2 is a diagram illustrating a method of additive manufacturing to sequentially form layers of the active-energy-ray-curable composition of the present disclosure one on top of the other by repeating discharging the curable composition to particular areas followed by curing upon irradiation of an active energy ray (details will be described below). FIGS. 3A to 3D are each a diagram illustrating a method of additive manufacturing to sequentially form cured layers 6 having respective predetermined forms one on top of the other on a movable stage 3 by irradiating a storing pool (storing part) 1 of the active energy ray curable composition 5 of the present disclosure with the active energy ray 4.

An apparatus for fabricating a three-dimensional object by the active-energy-ray-curable composition of the present disclosure is not particularly limited and can be a known apparatus. For example, the apparatus includes a containing device, a supplying device, and a discharging device of the curable composition, and an active energy ray irradiator.

In addition, the present disclosure includes cured materials obtained by curing the active-energy-ray-curable composition and processed products obtained by processing structures having the cured materials on a substrate. The processed product is fabricated by, for example, heat-drawing and punching a cured material or structure having a sheet-like form or film-like form. Examples thereof are gauges or operation panels of vehicles, office machines, electric and electronic machines, and cameras.

The substrate is not particularly limited. It can suitably be selected to a particular application. Examples thereof include paper, thread, fiber, fabrics, leather, metal, plastic, glass, wood, ceramic, or composite materials thereof. Of these, plastic substrates are preferred in terms of processability.

Drays/ability at 180° C. of the cured material of the present disclosure is preferably 50% or more, more preferably 100% or more when the drawability at 180° C. is determined based on the following: (length after tension test−length before tension test)/(length before tension test).

(Curable Composition)

A curable composition of the present invention includes a magenta pigment, a polymerizable compound, and a pigment adsorption component.

An amount of the pigment adsorption component ($A_0$) adsorbed onto 100 mg of the magenta pigment is from 10 mg through 60 mg.

The curable composition can be cured without irradiating the curable composition with active energy rays.

(Active-Energy-Ray-Curable Ink)

An active-energy-ray-curable ink of the present disclosure (hereinafter may be referred to as "ink") includes the active-energy-ray-curable composition of the present disclosure, and is preferably used for inkjet.

A static surface tension of the active-energy-ray-curable ink at 25° C. is preferably 20 mN/m or more but 40 mN/m or less, more preferably 28 mN/m or more but 35 mN/m or less.

A static surface tension balance (available from Kyowa Interface Science Co., Ltd, CBVP-Z) was used to measure the static surface tension of the active-energy-ray-curable ink at 25° C. The static surface tension was on the assumption of the specifications of a commercially available inkjet ejection head such as GEN4 (available from Ricoh Printing Systems, Ltd.).

<Composition Stored Container>

The composition stored container of the present disclosure contains the active-energy-ray-curable composition and is suitable for the applications as described above. For example, if the active-energy-ray-curable composition of the present disclosure is used for ink, a container that stores the ink can be used as an ink cartridge or an ink bottle. Therefore, users can avoid direct contact with the ink during operations such as transfer or replacement of the ink, so that fingers and clothes are prevented from contamination. Furthermore, inclusion of foreign matters such as dust in the ink can be prevented. In addition, the container can be of any size, any form, and any material. For example, the container can be designed to a particular application. It is preferable to use a light blocking material to block the light or cover a container with a light blocking sheet, etc.

<Image Forming Method and Image Forming Apparatus>

The image forming method of the present disclosure includes at least an irradiating step of irradiating the curable composition of the present disclosure with an active energy ray to cure the curable composition. The image forming apparatus of the present disclosure includes at least an irradiator to irradiate the curable composition of the present disclosure with an active energy ray and a storing part containing the active-energy-ray-curable composition of the present disclosure. The storing part may include the container mentioned above. Furthermore, the method and the apparatus may respectively include a discharging step and a discharging device to discharge the active energy ray curable composition. The method of discharging the curable composition is not particularly limited, and examples thereof include a continuous jetting method and an on-demand method. The on-demand method includes a piezo method, a thermal method, an electrostatic method, etc.

FIG. 1 is a diagram illustrating a two-dimensional image forming apparatus equipped with an inkjet discharging device, Printing units 23a, 23b, 23c, and 23d respectively having ink cartridges and discharging heads for yellow, magenta, cyan, and black active-energy-ray-curable inks discharge the inks onto a recording medium 22 fed from a supplying roller 21. Thereafter, light sources 24a, 24b, 24c, and 24d configured to cure the inks emit active energy rays to the inks, thereby curing the inks to form a color image. Thereafter, the recording medium 22 is conveyed to a processing unit 25 and a printed matter reeling roll 26. Each of the printing unit 23a, 23b, 23c and 23d may have a heating mechanism to liquidize the ink at the ink discharging portion. Moreover, in another embodiment of the present disclosure, a mechanism may optionally be included to cool down the recording medium to around room temperature in a contact or non-contact manner. In addition, the inkjet recording method may be either of serial methods or line methods. The serial methods include discharging an ink onto a recording medium by moving the head while the recording medium intermittently moves according to the width of a discharging head. The line methods include discharging an ink onto a recording medium from a discharging head held at a fixed position while the recording medium continuously moves.

The recording medium 22 is not particularly limited. Specific examples thereof include, but are not limited to, paper, film, metal, or complex materials thereof. The recording medium 22 takes a sheet-like form but is not limited thereto. The image forming apparatus may have a one-side printing configuration and/or a two-side printing configuration Optionally, multiple colors can be printed with no or weak active energy ray from the light sources 24a, 24b, and 24c followed by irradiation of the active energy ray from the light source 24d. As a result, energy and cost can be saved.

The recorded matter having images printed with the ink of the present disclosure includes articles having printed images or texts on a plain surface of conventional paper, resin film, etc., a rough surface, or a surface made of various materials such as metal or ceramic. In addition, by laminating layers of images in part or the entire of a recording medium, a partially stereoscopic image (formed of two dimensional part and three-dimensional part) and a three dimensional objects can be fabricated.

FIG. 2 is a schematic diagram illustrating another example of the image forming apparatus (apparatus to fabricate a 3D object) of the present disclosure. An image forming apparatus 39 illustrated in FIG. 2 sequentially forms thin layers one on top of the other using a head unit having inkjet heads arranged movable in the directions indicated by the arrows A and B. In the image forming apparatus 39, an ejection head unit 30 for additive manufacturing ejects a first active-energy-ray-curable composition, and ejection head units 31 and 32 for support and curing these compositions ejects a second active-energy-ray-curable composition having a different composition from the first active-energy-ray-curable composition, while ultraviolet irradiators 33 and 34 adjacent to the ejection head units 31 and 32 cure the compositions. To be more specific, for example, after the ejection head units 31 and 32 for support eject the second active-energy-ray-curable composition onto a substrate 37 for additive manufacturing and the second active-energy-ray-curable composition is solidified by irradiation of an active energy ray to form a first substrate layer having a space for composition, the ejection head unit 30 for additive manufacturing ejects the first active-energy-ray-curable composition onto the pool followed by irradiation of an active energy ray for solidification, thereby forming a first additive manufacturing layer. This step is repeated multiple times lowering the stage 38 movable in the vertical direction to laminate the supporting layer (or support layer) and the additive manufacturing layer to fabricate a solid object 35. Thereafter, an additive manufacturing support 36 is removed, if desired. Although only a single ejection head unit 30 for additive manufacturing is provided to the image forming apparatus illustrated 39 in FIG. 2, it can have two or more units 30.

(Two-Dimensional or Three-Dimensional Image)

A two-dimensional or three-dimensional image of the present disclosure is obtained by applying, to a substrate, the active-energy-ray-curable composition of the present disclosure or the active-energy-ray-curable ink of the present disclosure, and curing the active-energy-ray-curable composition or the active-energy-ray-curable ink.

Examples of the two-dimensional or three-dimensional image recorded using the active-energy-ray-curable ink of the present disclosure include a two-dimensional or three-dimensional image recorded on a smooth surface of plain paper or a resin film, a two-dimensional or three-dimensional image recorded on a concave-convex recorded surface, and a two-dimensional or three-dimensional image on a surface of the recording medium formed of various materials such as metal and ceramic.

Examples of the two-dimensional image include characters, symbols, figures, combinations thereof, and solid images.

Examples of the three-dimensional image include three-dimensional objects.

An average thickness of the three-dimensional objects is not particularly limited and may be appropriately selected depending on the intended purpose, but it is preferably 10 µm or more.

The two-dimensional or three-dimensional image includes the active-energy-ray-curable composition of the present disclosure or the active-energy-ray-curable ink of the present disclosure. Therefore, the two-dimensional or three-dimensional image formed on an impermeable substrate has excellent water resistance; i.e., the two-dimensional or three-dimensional image can maintain favorable close adhesiveness even after immersed in water.

The two-dimensional or three-dimensional image is preferably cured using a light-emitting diode having an irradiation dose of active energy rays of 500 mJ/cm$^2$ or less.

(Structure)

A structure of the present disclosure includes a substrate and the two-dimensional or three-dimensional image of the present disclosure on the substrate.

The substrate is not particularly limited and may be appropriately selected depending on the intended purpose.

(Processed Product)

A processed product of the present disclosure can be obtained by subjecting the two-dimensional or three-dimensional image of the present disclosure or the structure of the present disclosure to a drawing process.

EXAMPLES

The present disclosure will be described in more detail by way of the following Examples. However, the present disclosure should not be construed as being limited to these Examples.

The active-energy-ray-curable composition was determined for a 50% cumulative volume particle diameter ($D_{50}$), a distribution width of a particle size distribution, and an amine value of the dispersant polymer in the following manners.

<50% Cumulative Volume Particle Diameter ($D_{50}$) and Distribution Width of Particle Size Distribution>

An obtained active-energy-ray-curable composition was about 500-fold diluted in the polymerizable monomer used as the dispersion medium to measure the 50% cumulative volume particle diameter ($D_{50}$) using a particle size analyzer (product name: UPA150, available from NIKKISO CO., LTD.).

The distribution width of a particle size distribution was determined based on the following Formula (2). Here, the 84% cumulative volume particle diameter ($D_{84}$) and the 16% cumulative volume particle diameter ($D_{16}$) in the Formula (2) were measured in the same manner as in the measurement of the 50% cumulative volume particle diameter ($D_{50}$).

Distribution width of particle size distribution=(84% cumulative volume particle diameter-16% cumulative volume particle diameter)/2   Formula (2)

<Amine Value of Dispersant Polymer>

The dispersant polymer (1 g) was dissolved in methyl isobutyl ketone (100 mL). Then, potentiometric titration was performed using a 0.01 mol/L chloric acid methyl isobutyl ketone solution to measure a potential difference. Based on the obtained potential difference, an amine value was calculated. Here, an automatic titrator (device name: GT-200, available from Mitsubishi Chemical Analytech, Co., Ltd.) was used for the potentiometric titration.

(Preparation of Magenta Pigment Dispersion Liquid)

<Preparation of Magenta Pigment Dispersion Liquid A>

The dispersant polymer (product name: BYKJET-9151, available from BYK Japan KK, amine value: 17.2 mg KOH/g) (36 parts by mass) was charged into phenoxyethyl acrylate (product name: VISCOAT #192, available from Osaka Organic Chemical Industry Ltd., structural formula: the following formula (M-3)) (144 parts by mass) and was dissolved under stirring at 40° C. for 4 hours to prepare a dispersion medium.

A 70 mL mayonnaise jar (product name: UM SAMPLE JAR, available from AS ONE Corporation) was charged with zirconia balls having a diameter of 2 mm (80 parts by mass), C. I. Pigment Red 122 (product name: RGT, available from DIC Corporation, surface treatment: derivative) (3.38 parts by mass), and the dispersion medium (4.5 parts by mass). Then, phenoxyethyl acrylate (product name: VISCOAT #192, available from Osaka Organic Chemical Industry Ltd.) (14.62 parts by mass) was added to the mixture. The resultant mixture was dispersed with the below-described ball mill for 3 days to prepare [magenta pigment dispersion liquid A] (pigment concentration: 15% by mass).

—Conditions of Ball Mill—

Media: YTZ balls having a diameter of 2 mm (zirconia balls, available from NIKKATO CORPORATION)

Mill: MIX-ROTAR VMR-5 (available from AS ONE Corporation)

Number of rotations: number of rotations of the mayonnaise jar 75 rpm

<Preparation of Magenta Pigment Dispersion Liquids B to T>

Magenta pigment dispersion liquids B to T were prepared in the same manner as in the preparation of the magenta pigment dispersion liquid A except that the magenta pigment, the dispersant polymer, and the polymerizable compound in the preparation of the magenta pigment dispersion liquid A were changed to the compounds presented in the following Tables 1-1 and 1-2.

<Preparation of Magenta Pigment Dispersion Liquid C>

The dispersant polymer (product name: BYKJET-9151, available from BYK Japan KK, amine value: 17.2 mg KOH/g) (36 parts by mass) was charged into phenoxyethyl acrylate (VISCOAT #192, available from Osaka Organic Chemical Industry Ltd.) (144 parts by mass) and was dissolved under stirring at 40° C. for 4 hours to prepare a dispersion medium.

A 70 mL mayonnaise jar (product name: UM SAMPLE JAR, available from AS ONE Corporation) was charged with zirconia balls having a diameter of 2 mm (80 parts by mass), C. I. Pigment Red 122 (product name: ROT, available from DIC Corporation, surface treatment: derivative) (3.38 parts by mass), and the dispersion medium (10.15 parts by mass). Then, phenoxyethyl acrylate (product name: VISCOAT #192, available from Osaka Organic Chemical Industry Ltd.) (14.62 parts by mass) was added to the mixture. The resultant mixture was subjected to pre-dispersion with the below-described homogenizer for 10 minutes. Then, zirconia beads having a diameter of 0.5 mm were charged into a bead mill, and the resultant mixture was dispersed in the bead mill for 1 hour at a peripheral speed of 10 m/s to prepare pigment dispersion liquid C (pigment concentration: 15% by mass).

—Conditions of Homogenizer—

Homogenizer: HG30, C20 cutter (available from Hitachi Koki Co., Ltd.)

Number of rotations: 10,000 rpm

—Conditions of Bead Mill—

Media: YTZ balls having a diameter of 0.5 mm (zirconia balls, available from NIKKATO CORPORATION)

Mill: DYNO-MILL, MultiLab model (available from SHINMARU ENTERPRISES CORPORATION)

Peripheral speed: 10 m/s

<Preparation of Magenta Pigment Dispersion Liquid F>

The dispersant polymer (product name: BYKJET-9152, available from BYK Japan KK, amine value: 27.3 mg KOH/g) (36 parts by mass) was charged into phenoxyethyl acrylate (VISCOAT #192, available from Osaka Organic Chemical Industry Ltd.) (144 parts by mass) and was dissolved under stirring at 40° C. for 4 hours to prepare a dispersion medium.

A 70 mL mayonnaise jar (product name: UM SAMPLE JAR, available from AS ONE Corporation) was charged with zirconia balls having a diameter of 2 mm (80 parts by mass), C. I. Pigment Red 122 (product name: RGT, available from DIC Corporation, surface treatment: derivative) (6.75 parts by mass), and the dispersion medium (13.50 parts by mass). Then, phenoxyethyl acrylate (product name: VISCOAT #192, available from Osaka Organic Chemical Industry Ltd.) (2.25 parts by mass) was added to the mixture. The resultant mixture was dispersed with the below-described ball mill for 8 days (pigment concentration: 30% by mass). Then, phenoxyethyl acrylate (product name: VISCOAT #192, available from Osaka Organic Chemical Industry Ltd.) (22.5 parts by mass) was added to the mixture. The resultant mixture was dispersed with a ball mill for 2 hours to prepare [magenta pigment dispersion liquid F] (pigment concentration: 15% by mass).

—Conditions of Ball Mill—

Media: YTZ balls having a diameter of 2 mm (zirconia balls, available from NIKKATO CORPORATION)

Mill: MIX-ROTAR VMR-5 (available from AS ONE Corporation)

Number of rotations: number of rotations of the mayonnaise jar 75 rpm

<Preparation of Magenta Pigment Dispersion Liquid H>

The dispersant polymer (product name: SOLSPERSE 39000, available from The Lubrizol Corporation, amine value: 25.7 mg KOH/g) (36 parts by mass) was charged into phenoxyethyl acrylate (VISCOAT #192, available from Osaka Organic Chemical Industry Ltd.) (144 parts by mass) and was dissolved under stirring at 40° C. for 4 hours to prepare a dispersion medium.

A 70 mL mayonnaise jar (product name: UM SAMPLE JAR, available from AS ONE Corporation) was charged with zirconia balls having a diameter of 5 mm (80 parts by mass), C. I. Pigment Red 122 (product name: RGT, available from DIC Corporation, surface treatment: derivative) (3.38 parts by mass), and the dispersion medium (6.75 parts by mass). Then, phenoxyethyl acrylate (product name: VISCOAT #192, available from Osaka Organic Chemical Industry Ltd.) (12.37 parts by mass) was added to the mixture. The resultant mixture was dispersed with the below-described ball mill for 8 hours. After the zirconia balls having a diameter of 5 mm were removed from the mixture, zirconia balls having a diameter of 1 mm (80 parts by mass) were added to the mixture. The resultant mixture was dispersed with a ball mill for 2 days to prepare [magenta pigment dispersion liquid H] (pigment concentration: 15% by mass).

—Conditions of Ball Mill—

Media: YTZ balls having a diameter of 5 mm (zirconia balls, available from NIKKATO CORPORATION)

YTZ balls having a diameter of 1 mm (zirconia balls, available from NIKKATO CORPORATION)

Mill: MIX-ROTAR VMR-5 (available from AS ONE Corporation)

Number of rotations: number of rotations of the mayonnaise jar 75 rpm

<Preparation of Magenta Pigment Dispersion Liquid M>

The dispersant polymer (product name: BYKJET-9151, available from BYK Japan KK, amine value: 17.2 mg KOH/g) (36 parts by mass) was charged into phenoxyethyl acrylate (product name: VISCOAT #192, available from Osaka Organic Chemical Industry Ltd.) (144 parts by mass) and was dissolved under stirring at 40° C. for 4 hours to prepare a dispersion medium.

A 300 mL-Erlenmeyer flask was charged with C. I. Pigment Red 122 (product name: EBTRANSP, available from Clariant (Japan) K.K., surface treatment: derivative) (3.38 parts by mass) and the dispersion medium (6.75 parts by mass). Then, phenoxyethyl acrylate (product name: VISCOAT #192, available from Osaka Organic Chemical Industry Ltd.) (12.37 parts by mass) was added to the mixture. The resultant mixture was subjected to pre-dispersion with the below-described homogenizer for 10 minutes, and was dispersed with a medialess dispersion device at a treatment pressure of 150 MPa to prepare [magenta pigment dispersion liquid M] (pigment concentration: 15% by mass).

—Conditions of Homogenizer—

Homogenizer: HG30, C20 cutter (available from Hitachi Koki Co., Ltd.)

Number of rotations: 10,000 rpm

—Conditions of Medialess Dispersion Device—

Medialess dispersion device: NVC-ES008 (available from YOSHIDA KIKAI CO., LTD.)

Nozzle: cross (X-type)

Treatment pressure: 150 MPa

Number of passes: 30

The formulations and the dispersion methods of the obtained magenta dispersion liquids A to T are presented in Tables 1-1 and 1-2.

TABLE 1-1

| Magenta pigment dispersion liquids | Magenta pigments Compounds | Products | Amounts (% by mass) | Dispersant polymers Compounds | Amine value (mg KOH/g) | Amounts (% by mass) | Monofunctional, polymerizable compounds Compounds | Amounts (% by mass) | Dispersion methods |
|---|---|---|---|---|---|---|---|---|---|
| A | C.I. Pigment Red 122 | RGT | 15 | BYKJET-9151 | 17.2 | 3 | Phenoxyethyl acrylate | 82 | Ball mill |
| B | C.I. Pigment Red 122 | RGT | 15 | BYKJET-9151 | 17.2 | 6 | Phenoxyethyl acrylate | 79 | Ball mill |
| C | C.I. Pigment Red 122 | RGT | 15 | BYKJET-9151 | 17.2 | 9 | Phenoxyethyl acrylate | 76 | Bead mill |
| D | C.I. Pigment Red 122 | RGT | 15 | BYKJET-9151 | 17.2 | 12 | Phenoxyethyl acrylate | 73 | Bead mill |
| E | C.I. Pigment Red 122 | RGT | 15 | BYKJET-9152 | 27.3 | 3 | Phenoxyethyl acrylate | 82 | Ball mill |
| F | C.I. Pigment Red 122 | RGT | 15 | BYKJET-9152 | 27.3 | 3 | Phenoxyethyl acrylate | 82 | High concentration ball mill |
| G | C.I. Pigment Red 122 | RGT | 15 | BYKJET-9152 | 27.3 | 6 | Phenoxyethyl acrylate | 79 | Ball mill |
| H | C.I. Pigment Red 122 | RGT | 15 | SOLSPERSE 39000 | 25.7 | 6 | Phenoxyethyl acrylate | 79 | Two-stage ball mill |
| I | C.I. Pigment Red 122 | RGT | 15 | DISPERBYK-2050 | 30.7 | 6 | Phenoxyethyl acrylate | 79 | Ball mill |
| J | C.I. Pigment Red 122 | RGT | 15 | DISPERBYK-2150 | 56.7 | 6 | Phenoxyethyl acrylate | 79 | Ball mill |

TABLE 1-2

| Magenta pigment dispersion liquids | Magenta pigments Compounds | Products | Amounts (% by mass) | Dispersant polymers Compounds | Amine value (mg KOH/g) | Amounts (% by mass) | Monofunctional, polymerizable compounds Compounds | Amounts (% by mass) | Dispersion methods |
|---|---|---|---|---|---|---|---|---|---|
| K | C.I. Pigment Red 122/ C.I. Pigment Violet 19 | RFS | 15 | BYKJET-9151 | 17.2 | 6 | Phenoxyethyl acrylate | 79 | Bead mill |
| L | C.I. Pigment Red 122 | EBTRANSP | 15 | BYKJET-9151 | 17.2 | 6 | Phenoxyethyl acrylate | 79 | Bead mill |
| M | C.I. Pigment Red 122 | EBTRANSP | 15 | BYKJET-9151 | 17.2 | 6 | Phenoxyethyl acrylate | 79 | Medialess |
| N | C.I, Pigment Red 122 | E2Y | 15 | BYKJET-9151 | 17.2 | 6 | Phenoxyethyl acrylate | 79 | Bead mill |
| O | C.I. Pigment Red 122 | RGT | 15 | BYKJET-9151 | 17.2 | 6 | Acryloyl morpholine | 79 | Ball mill |
| P | C.I. Pigment Red 122 | RGT | 15 | BYKJET-9151 | 17.2 | 6 | Benzyl acrylate | 79 | Ball mill |
| Q | C.I. Pigment Red 122 | RGT | 15 | BYKJET-9151 | 17.2 | 1.5 | Phenoxyethyl acrylate | 83.5 | Ball mill |
| R | C.I. Pigment Red 122 | RGT | 15 | BYKJET-9151 | 17.2 | 15 | Phenoxyethyl acrylate | 70 | Ball mill |
| S | C.I. Pigment Red 122 | RTS | 15 | BYKJET-9151 | 17.2 | 6 | Phenoxyethyl acrylate | 79 | Ball mill |
| T | C.I. Pigment Red 122 | E01 | 15 | BYKJET-9152 | 27.3 | 6 | Phenoxyethyl acrylate | 79 | Ball mill |

In Tables 1-1 and 1-2, the product names and the manufacturers of the components are as follows.

RGT: C. I. Pigment Red 122, available from DIC Corporation, the pigment concentration in the magenta pigment dispersion liquid A: 15% by mass, surface treatment: derivative RFS: C. I. Pigment Red 122/C. I. Pigment Violet 19, available from DIC CORPORATION, the pigment concentration in the magenta pigment dispersion liquid K: 15% by mass, surface treatment: derivative EBTRANSP: C. I. Pigment Red 122, available from Clariant (Japan) K.K., the pigment concentration in the magenta pigment dispersion liquid L: 15% by mass, surface treatment: derivative E2Y: C. I. Pigment Red 122, available from Clariant (Japan) K.K., the pigment concentration in the magenta pigment dispersion liquid M: 15% by mass RTS: C. I. Pigment Red 122, available from DIC Corporation, the pigment concentration in the magenta pigment dispersion liquid R: 15% by mass, surface treatment: non-treatment E01: C. I. Pigment Red 122, available from Clariant (Japan) K.K., the pigment concentration in the magenta pigment dispersion liquid S: 15% by mass BYK JET-9151: available from BYK Japan KK, amine value: 17.2 mg KOH/g BYK JET-9152: available from BYK Japan KK, amine value: 27.3 mg KOH/g SOLSPERSE 39000: available from The Lubrizol Corporation, amine value: 25.7 mg KOH/g DISPERBYK-2050: available from BYK Japan KK, amine value: 30.7 mg KOH/g DISPERBYK-2150: available from BYK Japan KK, amine value: 56.7 mg KOH/g Phenoxyethyl acrylate: available from Osaka Organic Chemical Industry Ltd., product name: VISCOAT #192

Acryloyl morpholine: available from KOHJIN Film & Chemicals Co., Ltd., product name: ACMO Benzyl acrylate: available from Osaka Organic Chemical Industry Ltd., product name: VISCOAT #160

Example 1

The magenta pigment dispersion liquid A (26.5 parts by mass), phenoxyethyl acrylate (product name: VISCOAT #192, available from Osaka Organic Chemical Industry Ltd., monofunctional monomer) (37 parts by mass), isobornyl acrylate (product name: IBXA, available from Osaka Organic Chemical Industry Ltd., monofunctional monomer) (15 parts by mass), 1,9-nonanediol diacrylate (product name: VISCOAT #260, available from Osaka Organic Chemical Industry Ltd., bifunctional monomer) (1 part by mass), urethane acrylate resin (product name: UV-3010B, available from The Nippon Synthetic Chemical Industry Co., Ltd., ultraviolet-curable resin) (5.5 parts by mass), surfactant A (product name: BYK-3575, available from BYK Japan KK) (0.3 parts by mass), polymerization initiator A (IRGACURE 819 (available from BASF)) (6 parts by mass), polymerization initiator B (product name: DAROCURE TPO, available from BASF) (5 parts by mass), polymerization initiator C (product name: SPEEDCURE DETX, available from Lambson) (3.5 parts by mass), and p-methoxyphenol (available from Nippon Kayaku Co., Ltd.) (0.2 parts by mass) were mixed to obtain an active-energy-ray-curable composition of Example 1.

Examples 2 to 16 and Comparative Examples 1 to 4

Active-energy-ray-curable compositions of Examples 2 to 16 and Comparative Examples 1 to 4 were obtained in the same manner as in Example 1, except that the materials of Example 1 were changed to formulations and amounts presented in Tables 2 to 4. Formulations and amounts of Examples 1 to 16 and Comparative Examples 1 to 4 are presented in Tables 2 to 4.

TABLE 2

| | | | Examples | | | | | | |
|---|---|---|---|---|---|---|---|---|---|
| | | | 1 | 2 | 3 | 4 | 5 | 6 | 7 |
| Magenta pigment dispersion liquids | | Kinds | A | B | C | D | E | F | G |
| | | Amounts | 26.5 | 26.5 | 26.5 | 26.5 | 26.5 | 26.5 | 26.5 |
| Polymerizable compounds | Monofunctional monomers | Phenoxyethyl acrylate | 37 | 37 | 37 | 37 | 37 | 37 | 37 |
| | | Acryloyl morpholine | | | | | | | |
| | | Benzyl acrylate | | | | | | | |
| | | Isobornyl acrylate | 15 | 15 | 15 | 15 | 15 | 15 | 15 |
| | Bifunctional monomer | 1,9-Nonanediol diacrylate | 1 | 1 | 1 | 1 | 1 | 1 | 1 |
| Ultraviolet-curable resin | | Urethane acrylate resin | 5.5 | 5.5 | 5.5 | 5.5 | 5.5 | 5.5 | 5.5 |
| Surfactants | | Surfactant A | 0.3 | 0.3 | 0.3 | 0.3 | | | 0.3 |
| | | Surfactant B | | | | | 0.3 | 0.3 | |
| Polymerization initiators | | Polymerization initiator A | 6 | 6 | 6 | 6 | 7 | 7 | 7 |
| | | Polymerization initiator B | 5 | 5 | 6 | 5 | 5 | 5 | 5 |
| | | Polymerization initiator C | 3.5 | 3.5 | 2.5 | 3.5 | 2.5 | 2.5 | 2.5 |
| Polymerization inhibitor | | p-Methoxyphenol | 0.2 | 0.2 | 0.2 | 0.2 | 0.2 | 0.2 | 0.2 |

TABLE 3

| | | Examples | | | | | | |
|---|---|---|---|---|---|---|---|---|
| | | 8 | 9 | 10 | 11 | 12 | 13 | 14 |
| Magenta pigment dispersion liquids | Kinds | H | I | J | K | L | M | N |
| | Amounts | 26.5 | 26.5 | 26.5 | 26.5 | 26.5 | 26.5 | 26.5 |
| Polymerizable compounds | Monofunctional monomers | Phenoxyethyl acrylate | 37 | 37 | 37 | 37 | 37 | 37 | 37 |
| | | Acryloyl morpholine | | | | | | | |
| | | Benzyl acrylate | | | | | | | |
| | | Isobornyl acrylate | 15 | 15 | 15 | 15 | 15 | 15 | 15 |
| | Bifunctional monomer | 1,9-Nonanediol diacrylate | 1 | 1 | 1 | 1 | 1 | 1 | 1 |
| Ultraviolet-curable resin | Urethane acrylate resin | 5.5 | 5.5 | 5.5 | 5.5 | 5.5 | 5.5 | 5.5 |
| Surfactants | Surfactant A | | | 0.3 | 0.3 | | | 0.3 |
| | Surfactant B | 0.3 | 0.3 | | | 0.3 | 0.3 | |
| Polymerization initiators | Polymerization initiator A | 5 | 6 | 6 | 6 | 6 | 6 | 6 |
| | Polymerization initiator B | 6 | 6 | 5 | 6 | 5 | 5 | 6 |
| | Polymerization initiator C | 3.5 | 2.5 | 3.5 | 2.5 | 3.5 | 3.5 | 2.5 |
| Polymerization inhibitor | p-Methoxyphenol | 0.2 | 0.2 | 0.2 | 0.2 | 0.2 | 0.2 | 0.2 |

TABLE 4

| | | Examples | | Comparative Examples | | | |
|---|---|---|---|---|---|---|---|
| | | 15 | 16 | 1 | 2 | 3 | 4 |
| Magenta pigment dispersion liquids | Kinds | O | P | Q | R | S | T |
| | Amounts | 26.5 | 26.5 | 26.5 | 26.5 | 26.5 | 26.5 |
| Polymerizable compounds | Monofunctional monomers | Phenoxyethyl acrylate | | | 37 | 37 | 37 | 37 |
| | | Acryloyl morpholine | 37 | 15 | | | | |
| | | Benzyl acrylate | 15 | 37 | | | | |
| | | Isobornyl acrylate | | | 15 | 15 | 15 | 15 |
| | Bifunctional monomer | 1,9-Nonanediol diacrylate | 1 | 1 | 1 | 1 | 1 | 1 |
| Ultraviolet-curable resin | Urethane acrylate resin | 5.5 | 5.5 | 5.5 | 5.5 | 5.5 | 5.5 |
| Surfactants | Surfactant A | 0.3 | | 0.3 | 0.3 | | 0.3 |
| | Surfactant B | | 0.3 | | | 0.3 | 0.3 |
| Polymerization initiators | Polymerization initiator A | 6.5 | 6 | 6 | 6 | 6.5 | 7 |
| | Polymerization initiator B | 5.5 | 6 | 5 | 6 | 5.5 | 5 |
| | Polymerization initiator C | 2.5 | 2.5 | 3.5 | 2.5 | 2.5 | 2.5 |
| Polymerization inhibitor | p-Methoxyphenol | 0.2 | 0.2 | 0.2 | 0.2 | 0.2 | 0.2 |

In Tables 2 to 4, the product name and the manufacturer of a component is as follows.

Surfactant B: (product name: BYK-3575, available from BYK Japan KK)

In the obtained active-energy-ray-curable compositions of Examples 1 to 16 and Comparative Examples 1 to 4, the amount of the pigment adsorption component ($A_0$) adsorbed onto 100 mg of the magenta pigment was determined in the following manner.

First, a target composition (1 mL) was charged into a tube for centrifugal separation and was separated into a precipitated solid component (e.g., a pigment) and a supernatant liquid using a centrifugal separator (device name: tabletop high-speed microcentrifuge CT 13 model, available from Hitachi Koki Co., Ltd., conditions: 13,000 rpm, 90 minutes). After the supernatant liquid was removed, acetone was added to the precipitated solid component so as to be 1 mL in total. The precipitated solid component was pulverized using a spatula and was subjected to ultrasonic dispersion for 20 minutes. The washing step (centrifugal separation and addition of acetone) was repeated four times to remove the supernatant liquid to obtain a precipitated solid component. Acetone was completely removed from the obtained precipitated solid component under reduced pressure at 25° C., to take out a magenta pigment onto which the pigment adsorption component was adsorbed. The obtained magenta pigment (100 mg) was baked in an electric furnace (device name: ROP-001, available from AS ONE Corporation, conditions: 400° C., 60 minutes). A difference in mass between the magenta pigment onto which the pigment adsorption component was adsorbed after baking and the magenta pigment onto which the pigment adsorption component was adsorbed before baking was defined as the amount of the pigment adsorption component.

After the active-energy-ray-curable composition was left to stand at 70° C. for 14 days, an amount of the pigment adsorption component adsorbed onto 100 mg of the magenta pigment A was determined in the same manner as in the above manner. Then, the percentage of change in the amount of the pigment adsorption component ($\Delta A$) was determined based on the following Formula (1).

$$\Delta A\ (\%) = |A - A_0|/A_0 \times 100 \qquad (1)$$

The obtained active-energy-ray-curable compositions of Examples 1 to 16 and Comparative Examples 1 to 4 were evaluated for liquid permeability (initial liquid permeability and liquid permeability after storage), ejecting ability (initial ejecting ability and ejecting ability after storage), percentage of change in viscosity (storage stability), curing ability, and close adhesiveness in the following manners. Results are presented in Tables 5-1 and 5-2.

(Liquid Permeability)

Each (100 mL) of the active-energy-ray-curable compositions of Examples 1 to 16 and Comparative Examples 1 to 4 was allowed to pass through a 10.0 µm-hydrophobic PTFE membrane filter at a pressure condition of 50 kPa and was evaluated for initial liquid permeability. The active-energy-ray-curable composition after left to stand at 70° C. for 14 days used for the evaluation of the below-described storage stability was also evaluated for liquid permeability (liquid permeability after storage).

—Evaluation Criteria—

A: The active-energy-ray-curable composition (100 mL) completely permeated.

B: Only 50 mL or more but less than 75 mL of the active-energy-ray-curable composition permeated.

C: Only 25 mL or more but less than 50 mL of the active-energy-ray-curable composition permeated.

D: Only less than 25 mL of the active-energy-ray-curable composition permeated.

(Ejecting Ability)

A piezo inkjet head capable of adjusting a temperature of ink from an ink supplying system to a head part was used for an inkjet recording device. This inkjet recording device was loaded with each of the active-energy-ray-curable compositions of Examples 1 to 16 and Comparative Examples 1 to 4. Then, a temperature of the active-energy-ray-curable composition was adjusted to a temperature at which viscosity of the active-energy-ray-curable composition was 10 mPa·s. Then, the active-energy-ray-curable composition was evaluated for initial ejecting ability at an ejection speed of 3 kHz. The active-energy-ray-curable composition was consecutively ejected for 60 minutes. After this 60-minute ejection, the active-energy-ray-curable composition was evaluated for initial ejecting ability based on the following evaluation criteria. Moreover, the active-energy-ray-curable composition after left to stand at 70° C. for 14 days used for the evaluation of the below-described storage stability was loaded to the inkjet recording device and was evaluated for ejection ability (ejecting ability after storage). The temperature conditions of the ejecting ability after storage were the same conditions of the initial ejecting ability.

Here, a cone plate viscometer capable of adjusting temperatures was used to examine a temperature condition under which viscosity of the ink became 10.0±0.5 mPa·s. The obtained temperature condition was defined as a heating condition under recording.

—Evaluation Criteria—

B: All of the nozzles normally ejected the active-energy-ray-curable composition.

C: Some nozzles caused nozzle clogging and did not eject the active-energy-ray-curable composition.

D: Most of the nozzles did not eject the active-energy-ray-curable composition.

(Storage Stability)

Immediately after the active-energy-ray-curable compositions of Examples 1 to 16 and Comparative Examples 1 to 4 were prepared, each of the active-energy-ray-curable compositions was measured for initial viscosity using a cone plate rotary viscometer (device name: VISCOMETER TV-22, available from Toki Sangyo Co., Ltd.) under the following conditions: temperature of circulating water having a constant temperature: 25° C.; number of rotations: 50 rpm; and shear velocity: 191.4 sec$^{-1}$. After that, the active-energy-ray-curable composition was left to stand at 70° C. for 14 days. Then, viscosity after storage was measured under the same conditions as in the measurement of the initial viscosity. A percentage of change in viscosity was calculated based on the following Formula (3). The lower the percentage of change in viscosity is, the more excellent storage stability and dispersibility are.

Percentage of change in viscosity (%)=((viscosity after storage at 70° C. for 14 days−initial viscosity)/initial viscosity)×100   Formula (3)

(Curing Ability—Evaluation of Surface Curing Ability—)

A printer for evaluation obtained by modifying a printer (device name: SG7100, available from Ricoh Company, Ltd.) was used to obtain a solid image of the obtained active-energy-ray-curable composition (10 cm×10 cm) on a recording medium (product name: COSMOSHINE A4300 coat PET film, available from TOYOBO CO., LTD., average thickness: 100 µm, color: transparent). The obtained solid image was subjected to a curing treatment using an UV-LED device for an inkjet printer (device name: UV-LED module, single-pass water cooling, available from USHIO INC.) under the following conditions: illuminance of 1 W/cm$^2$ and irradiation dose of 500 mJ/cm$^2$, to obtain an image (cured material) having an area of 10 cm×10 cm and an average thickness of 10 µm.

Here, the irradiation dose was measured using an ultraviolet intensity meter (device name: UM-10) and a light receiver (device name: UM-400) (both devices are available from KONICA MINOLTA, INC.). As a method for measuring the average thickness, thicknesses of the image were measured using an electronic micrometer (available from ANRITSU CORPORATION) and the average thickness was determined by using thicknesses at 10 portions on the image. The printer for evaluation includes a conveying part and a driving part of device name: SG7100. However, its head was changed to an MH2620 head (available from Ricoh Company, Ltd.) being capable of performing ejection by heat and being adaptable to inks having high viscosity.

The obtained image (cured material) was rubbed 10 times in a reciprocating manner with a white cotton attached to a crock meter (device name: NO416, available from YASUDA SEIKI SEISAKUSHO, LTD.) with a load of 50 g/cm$^2$. Then, a reflection spectral densitometer (device name: X-RITE 939, available from X-Rite) was used to measure a density of the white cotton before and after rubbing. The density before rubbing 10 times in a reciprocating manner was deducted from the density after rubbing 10 times in a reciprocating manner to obtain a calculated value. The obtained calculated value was evaluated for "curing ability" based on the following evaluation criteria.

—Evaluation Criteria—

A: 0.001 or less

B: More than 0.001 but 0.005 or less

C: More than 0.005 but 0.009 or less

D: More than 0.009

(Close Adhesiveness—Evaluation of Inner Curing Ability—)

The obtained active-energy-ray-curable composition was used to obtain an image (cured material) having an area of 10 cm×10 cm and an average thickness of 10 µm in the same manner as in the aforementioned evaluation. A solid part of the obtained image (cured material) was cut with a cutter knife at 1 mm-intervals to have 100 squares of the solid image according to JIS K5400. Then, the solid image was peeled with a piece of an adhesive cellophane tape (product name: Scotch Mending tape (18 mm), available from 3M company). Squares that were not peeled were observed and counted with a loupe (product name: PEAK No. 1961 (×10), available from Tohkai Sangyo Co., Ltd) to evaluate "close adhesiveness" based on the following evaluation criteria.

—Evaluation Criteria—
A: The number of the squares that were not pealed was 100 squares per 100 squares
B: The number of the squares that were not pealed was 80 squares or more but 99 squares or less per 100 squares
C: The number of the squares that were not pealed was 40 squares or more but 79 squares or less per 100 squares
D: The number of the squares that were not pealed was 39 squares or less per 100 squares

TABLE 5-1

|  |  | Amount of pigment adsorption component (mg) | Percentage of change in amount of pigment adsorption component (%) | Cumulative volume particle diameter (D50) (nm) | Distribution width of particle size distribution (nm) | Initial liquid permeability | Liquid permeability after storage | Initial ejecting ability | Ejecting ability after storage | Percentage of change in viscosity (%) | Curing ability | Close adhesiveness |
|---|---|---|---|---|---|---|---|---|---|---|---|---|
| Ex. | 1 | 14 | −12 | 176 | 77 | B | C | B | C | 10 | B | B |
|  | 2 | 34 | 2 | 165 | 74 | A | A | B | B | 2 | A | A |
|  | 3 | 44 | 6 | 163 | 79 | B | B | B | B | 3 | B | B |
|  | 4 | 57 | −8 | 176 | 71 | C | C | B | B | 1 | B | C |
|  | 5 | 19 | −8 | 176 | 78 | A | B | B | C | 10 | A | B |
|  | 6 | 26 | −3 | 172 | 80 | A | A | B | B | 4 | A | A |
|  | 7 | 38 | 4 | 165 | 80 | A | A | B | B | 1 | A | A |
|  | 8 | 29 | −10 | 179 | 88 | B | B | B | C | 14 | B | B |
|  | 9 | 25 | −21 | 185 | 87 | B | C | B | C | 13 | B | C |
|  | 10 | 10 | −22 | 191 | 92 | B | C | C | C | 19 | B | C |
|  | 11 | 35 | 4 | 110 | 67 | A | A | B | B | 2 | A | A |
|  | 12 | 13 | −24 | 147 | 111 | B | C | C | C | 11 | B | C |
|  | 13 | 19 | −18 | 145 | 88 | B | B | B | C | 10 | B | B |
|  | 14 | 12 | −5 | 212 | 88 | B | C | B | C | 18 | B | C |
|  | 15 | 29 | −4 | 176 | 86 | B | B | B | B | 5 | A | A |
|  | 16 | 32 | 5 | 168 | 79 | B | B | B | B | 3 | A | A |

TABLE 5-2

|  |  | Amount of pigment adsorption component (mg) | Percentage of change in amount of pigment adsorption component (%) | Cumulative volume particle diameter (D50) (nm) | Distribution width of particle size distribution (nm) | Initial liquid permeability | Liquid permeability after storage | Initial ejecting ability | Ejecting ability after storage | Percentage of change in viscosity (%) | Curing ability | Close adhesiveness |
|---|---|---|---|---|---|---|---|---|---|---|---|---|
| Comp. Ex. | 1 | 3 | −1 | 178 | 82 | B | D | B | D | 30 | B | C |
|  | 2 | 68 | −18 | 185 | 92 | C | C | D | D | 4 | B | C |
|  | 3 | 7 | 24 | 322 | 150 | D | D | D | D | 44 | C | D |
|  | 4 | 8 | −25 | 284 | 146 | D | D | D | D | 37 | D | D |

From the results in Tables 5-1 and 5-2, it is found that the active-energy-ray-curable compositions of Examples 1 to 16 have favorable dispersion stability and are excellent in liquid permeability and ejecting ability.

Meanwhile, the active-energy-ray-curable compositions of Comparative Examples 1 to 4 are insufficient in dispersion stability, liquid permeability, and ejecting ability. The active-energy-ray-curable compositions in which the amounts of the dispersant polymers free from the pigment are large result in poor surface curing ability and poor internal curing ability. The curing ability of the surface of the coated film can be evaluated by the evaluation of the curing ability. The curing ability of the inside of the coated film can be evaluated by the evaluation of the close adhesiveness.

Compared with Example 5, an amount of the dispersant polymer adsorbed in Example 6 is large due to differences in dispersion methods. Although the active-energy-ray-curable compositions of Comparative Examples 1 and 2 include the same pigment as the Examples, they are deteriorated in dispersion stability, liquid permeability, ejecting ability due to differences in formulations dispersed. As described above, the desired effects of the present disclosure can be realized by adjusting the amount of the pigment adsorption component ($A_0$) adsorbed onto 100 mg of the magenta pigment to be from 10 mg through 60 mg.

What is claimed is:
1. A curable composition, comprising:
   a magenta pigment in a range of from 1 to 5% by mass, relative to a total composition mass;
   a polymerizable compound in a range of from 50 to 95% by mass, relative to the total composition mass; and
   a polymer, comprising an amino group, and having a weight average molecular weight of 1,000 or more, in a range of from 20 to 70% by mass, relative to a total magenta pigment mass,
   wherein the polymer is at least one selected from the group consisting of a hydroxyl group-comprising carboxylate ester, a high molecular weight long-chain polyamino amide salt, a high molecular weight long-chain polyamino acid ester, a high molecular weight polycarboxylic acid salt, long-chain polyaminoamide salt, long-chain polyaminoamide polar acid ester salt, a high molecular weight unsaturated acid ester, a modified polyurethane, a modified polyacrylate, polyether ester anionic surfactant, a naphthalenesulfonic acid-formalin condensate salt, a polyoxyethylene alkyl phosphoric acid ester, a polyoxyethylene nonylphenylether, polyester polyamine, and a mixture of two or more of any of these, and wherein the polymer has an amine value in a range of from 17.2 to 30.7 mg KOH/g.

2. The composition of claim 1, wherein the polymer is present in an amount of from 30 to 70% by mass, relative to the total magenta pigment mass.

3. The composition of claim 1, wherein the polymer has an amine value in a range of from 17.2 to 30 mg KOH/g.

4. The composition of claim 3, wherein the polymer has an amine value in a range of from 25.7 to 30 mg KOH/g.

5. The composition of claim 1, which is an active-energy-ray-curable composition.

6. The composition of claim 1, configured to be cured without irradiating the curable composition with active energy rays.

7. The composition of claim 1, wherein an amount of the polymer adsorbed onto 100 mg of the magenta pigment is in a range of from 10 to 60 mg.

8. The composition of claim 1, wherein an amount of the polymer adsorbed onto 100 mg of the magenta pigment is in a range of from 15 to 50 mg.

9. The composition of claim 1, wherein an amount of the polymer adsorbed onto 100 mg of the magenta pigment is in a range of from 20 to 40 mg.

10. The composition of claim 1, wherein the magenta pigment is a surface-treated magenta pigment that was surface treated with an acid.

11. The composition of claim 1, wherein a percentage of change in an amount of the polymer ($\Delta A$) as determined by Formula (1) below is within ±20%:

$$\Delta A\ (\%) = (A-A_0)/A_0 \times 100 \qquad (1),$$

wherein $A_0$ is a total amount of the polymer and A is an amount of the polymer adsorbed onto the 100 mg of the magenta pigment after the composition is left to stand at 70° C. for 14 days.

12. The composition of claim 1, having a 50% cumulative volume particle diameter in a range of from 80 to 180 nm.

13. The composition of claim 1, having a distribution width of a particle size distribution, determined by Formula (2), of 90 nm or less:

$$DW_{PSD} = (CVPD_{84} - CVPD_{16}) \div 2 \qquad (2),$$

wherein $DW_{PSD}$ is a distribution width of particle size distribution, $CVPD_{84}$ is an 84% cumulative volume particle diameter, and $CVPD_{16}$ is a 16% cumulative volume particle diameter.

14. A curable ink, comprising the curable composition of claim 1.

15. A composition stored container, comprising:
the curable composition of claim 1; and
a container comprising the active-energy-ray-curable composition.

16. A two-dimensional or three-dimensional image forming apparatus, comprising:
a storing part comprising the curable ink of claim 14; and
an irradiator configured to irradiate the curable ink with active energy rays.

17. The apparatus of claim 16, further comprising:
an ejecting unit configured to eject the curable ink by an inkjet recording system.

18. The composition of claim 1, wherein the polymer has an amine value in a range of 25.7 to 30.7 mg KOH/g.

19. The composition of claim 1, wherein the polymer has an amine value in a range of 27.3 to 30.7 mg KOH/g.

20. The composition of claim 1, wherein the polymerizable compound is a (meth)acrylate compound, (meth)acrylamide compound, aromatic vinyl compound, or a mixture of two or more of any of these.

* * * * *

UNITED STATES PATENT AND TRADEMARK OFFICE
CERTIFICATE OF CORRECTION

PATENT NO. : 11,193,028 B2  
APPLICATION NO. : 16/796558  
DATED : December 7, 2021  
INVENTOR(S) : Hirade et al.

Page 1 of 1

It is certified that error appears in the above-identified patent and that said Letters Patent is hereby corrected as shown below:

On the Title Page

Column 1, Item (71), the Applicant, "RICOH COMPANY LTD.," should read
--RICOH COMPANY, LTD.,--;

Column 1, Item (73), the Assignee, "RICOH COMPANY, LTD," should read
--RICOH COMPANY, LTD.,--.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*